(12) United States Patent
Kokorich et al.

(10) Patent No.: US 12,069,489 B2
(45) Date of Patent: Aug. 20, 2024

(54) SATELLITE RECEIVER WITH DYNAMICALLY SELECTED SWITCHED ANTENNA ELEMENTS

(71) Applicant: Rovial SAS, Paris (FR)

(72) Inventors: Mikhail Kokorich, Payerne (CH); Raghunath Das, Gaithersburg, MD (US); Peter S Ruderman, San Francisco, CA (US); Brian Adam Cooper, Round Mountain, CA (US)

(73) Assignee: Rovial SAS, Paris (FR)

( * ) Notice: Subject to any disclaimer, the term of this patent is extended or adjusted under 35 U.S.C. 154(b) by 306 days.

(21) Appl. No.: 17/576,809

(22) Filed: Jan. 14, 2022

(65) Prior Publication Data

US 2023/0232248 A1 Jul. 20, 2023

(51) Int. Cl.
*H04W 16/28* (2009.01)
*H01Q 3/24* (2006.01)
*H04B 7/185* (2006.01)

(52) U.S. Cl.
CPC ........ *H04W 16/28* (2013.01); *H04B 7/18539* (2013.01); *H04B 7/18547* (2013.01); *H01Q 3/247* (2013.01)

(58) Field of Classification Search
CPC ............... H04W 16/28; H04B 7/18539; H04B 7/18547; H01Q 3/247
See application file for complete search history.

(56) References Cited

U.S. PATENT DOCUMENTS 10,128,931 B2 11/2018 Rothaar et al.
10,784,953 B2 * 9/2020 Schloemer ......... H04B 7/18556
10,840,998 B2 11/2020 Lofquist
10,892,816 B1 * 1/2021 Struhsaker ............... H01Q 3/26
2017/0082753 A1 3/2017 Chang
(Continued)

FOREIGN PATENT DOCUMENTS

CN 113472398 A 10/2021

OTHER PUBLICATIONS

Hum, Sean Victor, and Julien Perruisseau-Carrier. "Reconfigurable reflectarrays and array lenses for dynamic antenna beam control: A review." IEEE transactions on antennas and propagation 62.1 (2013): 183-198. (Year: 2013).*

(Continued)

*Primary Examiner* — Sharad Rampuria
(74) *Attorney, Agent, or Firm* — Steven Stupp

(57) ABSTRACT

A satellite receiver with a switchable array of antenna elements for receiving wireless signals from at least a satellite is described. The antenna elements may be dynamically selected based at least in part on a location and motion of the satellite receiver, and a location and a motion of at least the satellite that provides wireless signals. Moreover, the antenna elements may also be dynamically selected based at least in part on utilization and/or availability of a terrestrial wireless communication network that communicates with the satellite receiver. The satellite receiver may predict availability of communication with at least the satellite. Furthermore, the array of antenna elements may provide improved power efficiency, pointing accuracy and/ or isotropic gain relative to an array of antenna elements without switched antenna elements, such as for carrier frequencies in the V or the W band of frequencies.

20 Claims, 16 Drawing Sheets

(56) References Cited

U.S. PATENT DOCUMENTS

| | | |
|---|---|---|
| 2019/0372656 A1 | 12/2019 | Fang et al. |
| 2020/0259250 A1 | 8/2020 | Diamond et al. |
| 2021/0021331 A1 | 1/2021 | Wyler et al. |
| 2021/0033714 A1* | 2/2021 | Nath .................. H01Q 21/22 |

OTHER PUBLICATIONS

Extended European Search Report, EP Patent Appl. No. 22159295.9, Aug. 16, 2022.

* cited by examiner

SATELLITE RECEIVER WITH DYNAMICALLY SELECTED SWITCHED ANTENNA ELEMENTS

FIELD

The described embodiments relate to techniques for communicating with one or more satellites. Notably, the described embodiments relate to a communication system and a satellite receiver that communicates with one or more satellites using dynamically selected switched antenna elements having predefined fields of view.

BACKGROUND

In mobile satellite communication or working in near-geostationary or near-geosynchronous satellite constellations (NGSO), an antenna is expected to be able to respond to changes in direction of mobile objects and/or to track satellite movements. Several existing antennas can meet these criteria and are available practically.

For example, one low-cost antenna that can be used in satellite communication, and specifically in mobility applications, is an omni-directional or an isotropic antenna. However, an antenna for a mobile application typically needs to be compact and as lightweight as possible in order to minimize the space and for ease of installation. While a compact omnidirectional antenna can satisfy the ease of installation and space requirements, this type of antenna often has low gain (such as 0-4 dBi) because of the isotropy in conical-cut direction and a wide beam width, which usually make an omnidirectional antenna unsuitable for NGSO constellations. Moreover, because of its low gain and limited electrical power, it is usually quite difficult for this type of antenna to have sufficient receiving capability (e.g., the gain and noise temperature figures of merit, G/T) and transmission power (e.g., the equivalent isotropically radiated power or EIRP). These limitations are particularly pronounced in the higher frequency bands, such as the V band of frequencies or the W band of frequencies.

A beam-tracking phased array antenna may solve these problems. This type of antenna includes multiple antenna elements. It may generate a directional beam via collaboration between the antenna elements, and the beam can be deflected towards a satellite direction while the azimuth of a mobile station or receiver changes and/or as the satellite moves. For example, mechanical or electrical steering may be used to deflect the beam. However, mechanical steering often makes the antenna structure bulky and has high power consumption with low-speed tracking because of the use of electric motors for the mechanical steering.

Alternatively, a planar phased array antenna may be used. This type of antenna performs beam steering using an electronic circuit by changing the phase of the antenna elements. However, the use of phase shifters to form beams is usually very costly because of the need for a large number of antenna elements and complicated electrical circuits. Moreover, the electrical circuit are often expensive, because the design needs to prevent beam squinting in which the beam direction differs considerably at the receive and transmit frequencies. Furthermore, beam-tracking or steering antenna systems may not be feasible or may be extremely expensive at very high frequency bands, such as the V band of frequencies or the W band of frequencies.

SUMMARY

In a first group of embodiments, an electronic device is described. This electronic device includes: one or more antenna elements that receive wireless signals associated with one or more satellites and to provide corresponding electrical signals; and an integrated circuit that receives the electrical signals, where the electrical signals have carrier frequencies in a V band of frequencies or a W band of frequencies. Moreover, the one or more satellites have eccentric geosynchronous or near-geosynchronous orbits that are inclined relative to an equatorial plane of the Earth, have ground tracks substantially along one or more continents, and are in view of first population regions in the one or more continents with a higher frequency than second population regions in the one or more continents. Furthermore, a given antenna element in the one or more antenna elements has a magnitude of an elevation angle exceeding a predefined value and the electrical signals convey information at a data rate exceeding a second predefined value.

Note that the predefined value may be 62°.

Moreover, the one or more antenna elements may provide a coverage angle of 56°.

Furthermore, the second predefined value may be 50 Mbps.

Additionally, the electronic device may concurrently communicate with two or more satellites.

In some embodiments, the first population regions may have population densities exceeding a third predefined value and the second population regions may have population densities below the third predefined value.

Note that an eccentricity of the eccentric geosynchronous or near-geosynchronous orbits may be between 0.12 and 0.3.

Another embodiment provides a satellite in the one or more satellites.

Another embodiment provides a communication system that includes the one or more satellites and the electronic device.

Another embodiment provides a computer-readable storage medium for use with the electronic device or the satellite. When executed by the electronic device or the satellite, this computer-readable storage medium causes the electronic device or the satellite to perform at least some of the aforementioned operations.

Another embodiment provides a method, which may be performed by the electronic device or the satellite. This method includes at least some of the aforementioned operations.

In a second group of embodiments, an electronic device is described. This electronic device includes: an array of antenna elements having associated predefined fields of view that receive wireless signals associated with at least a satellite and provide corresponding electrical signals, where at least two of the antenna elements in the array of antenna elements have different predefined fields of view; one or more switches that selectively couple to antenna elements in the array of antenna elements; and one or more integrated circuits that receive the electrical signals. During operation, the one or more integrated circuits dynamically select at least a given antenna element in the array of antenna elements based at least in part on a location and motion of the electronic device, and a location and motion of at least the satellite. Then, the one or more integrated circuits provide control signals to at least one of the one or more switches to selectively couple to at least the given antenna element. Moreover, the one or more integrated circuits receive, via the given antenna element, the electrical signals.

Note that the antenna elements in the array of antenna elements may be non-planar.

Moreover, the location and motion of at least the satellite may be predefined.

Furthermore, the location of the electronic device may include latitude and longitude of the electronic device.

Additionally, the one or more integrated circuits may selectively communicate with a terrestrial wireless communication network, and where the given antenna element may be dynamically selected based at least in part on at least one of: utilization of the terrestrial wireless communication network; or availability of the terrestrial wireless communication network.

In some embodiments, the one or more integrated circuits may selectively communicate with the terrestrial wireless communication network and the communication with the terrestrial wireless communication network may be bidirectional.

Note that the electronic device may selectively accept or reject receiving of content conveyed by the electrical signals.

Moreover, the electronic device may predict availability of communication with at least the satellite.

Furthermore, the one or more integrated circuits may predict a data rate of communication with at least the satellite based at least in part on the given antenna element.

Additionally, the given antenna element may be dynamically selected based at least in part on utilization of at least the satellite.

In some embodiments, the given antenna element may have an associated data rate of communication with at least the satellite and the given antenna element may be dynamically selected based at least in part on a priority of content conveyed by the electrical signals.

Note that the electronic device may concurrently receive second electrical signals associated with a second satellite, and the electrical signals and the second electrical signals may provide: redundancy of communicated information, and/or communicate different data streams.

Moreover, the wireless signals may have carrier frequencies in a V band of frequencies or a W band of frequencies and the array of antenna elements may have improved power efficiency, pointing accuracy and/or isotropic gain relative to an array of antenna elements without switched antenna elements.

Another embodiment provides at least the satellite.

Another embodiment provides a communication system that includes at least the satellite and the electronic device.

Another embodiment provides a computer-readable storage medium for use with the electronic device or the satellite. When executed by the electronic device or the satellite, this computer-readable storage medium causes the electronic device or the satellite to perform at least some of the aforementioned operations.

Another embodiment provides a method, which may be performed by the electronic device or the satellite. This method includes at least some of the aforementioned operations.

In a third group of embodiments, a satellite is described. This satellite includes: a set of antenna elements having associated predefined directions and predefined beam angles, where at least two antenna elements in the set of antenna elements have at least one of: different predefined directions, or different predefined beam angles; and one or more integrated circuits that transmit, via one or more antennal elements in the set of antenna elements, wireless signals to electronic devices in a region on a surface of the Earth. During operation, the one or more integrated circuits dynamically select at least a given antenna element based at least in part on: utilization of a terrestrial wireless communication network used by the electronic devices; and/or availability of the terrestrial wireless communication network. Moreover, the one or more integrated circuits change an attitude of the satellite based at least in part on the given antenna element, where the changed attitude positions the region in a predefined beam angle of the given antenna element.

Note that, when the at least two antenna elements have different predefined beam angles, the at least two antenna elements may have different associated data rates of communication.

Moreover, the one or more integrated circuits may dynamically select the region. For example, the region may be dynamically selected based at least in part on weather conditions associated with the region.

Furthermore, the satellite may receive information specifying the region, and the utilization or the availability of the terrestrial wireless communication network.

Additionally, the given antenna element may be dynamically selected based at least in part on weather conditions associated with the region.

In some embodiments, the given antenna element may be dynamically selected based at least in part on a priority of content conveyed by the wireless signals.

Note that the electronic devices may be mobile.

Moreover, the satellite may include a power amplifier that transmits wireless signals having carrier frequencies in a V band of frequencies or a W band of frequencies and power greater than 75 W, and that has a DC radio-frequency (RF) power conversion efficiency exceeding a predefined value.

Another embodiment provides an electronic device in the electronic devices.

Another embodiment provides a communication system that includes the satellite and the electronic device.

Another embodiment provides a computer-readable storage medium for use with the electronic device or the satellite. When executed by the electronic device or the satellite, this computer-readable storage medium causes the electronic device or the satellite to perform at least some of the aforementioned operations.

Another embodiment provides a method, which may be performed by the electronic device or the satellite. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
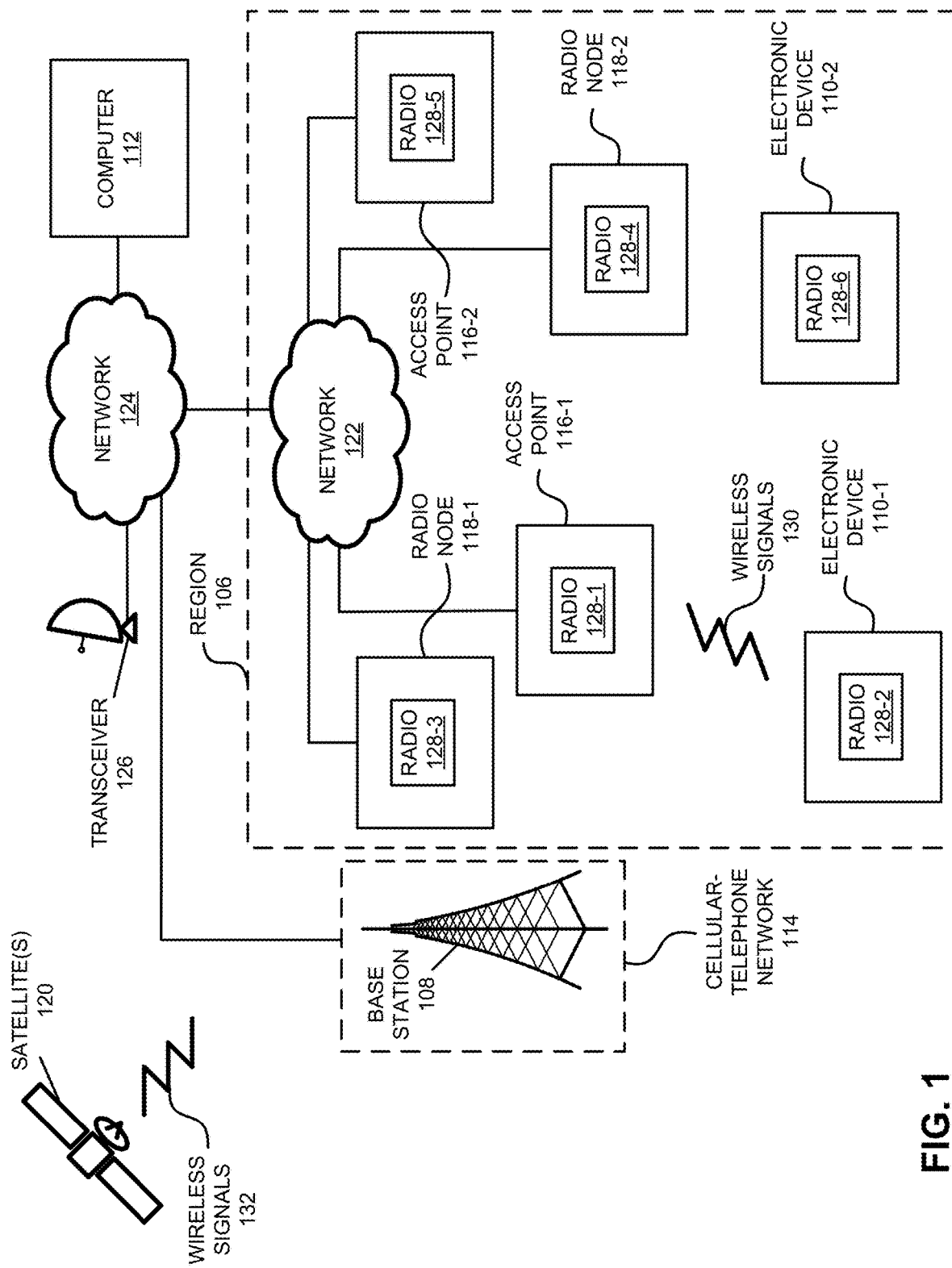
FIG. 1 is a block diagram illustrating an example of communication among electronic devices in a system in accordance with an embodiment of the present disclosure.

In a first group of embodiments, a satellite receiver for wireless signals having carrier frequencies in the V band of frequencies or the W band of frequencies is described. The satellite receiver may receive the wireless signals at high elevation angles, such as greater than 62°. This high elevation angle may reduce losses, which may allow the satellite receiver to communicate at a data rate of at least 50 Mbps. In order to accommodate these system requirements, the one or more satellites that provide the wireless signals may have eccentric geosynchronous or near-geosynchronous orbits that are inclined relative to an equatorial plane of the Earth, such as an eccentricity between 0.12 and 0.3. Moreover, the one or more satellites may have ground tracks substantially along one or more continents, and may be in view of dense population regions in the one or more continents with a higher frequency than low-density population regions in the one or more continents.

By utilizing eccentric geosynchronous or near-geosynchronous orbits and, thus, the high elevation angle, these communication techniques may enable high-date-rate communication in the V band of frequencies and/or the W band of frequencies. Notably, the high elevation angle may reduce the path loss (such as atmospheric loss) and/or shadowing, thereby increasing the receiving capability of the satellite receiver. Moreover, the V band of frequencies and/or the W band of frequencies may be less crowded or congested, so that more bandwidth is available for communication between the one or more satellites and the satellite receivers. Consequently, the communication techniques may provide improved communication performance, which may improve the customer experience when using the satellite receiver, the one or more satellites and/or a communication system that includes the satellite receiver and the one or more satellites.

In a second group of embodiments, a satellite receiver with a switchable array of antenna elements for receiving wireless signals from at least a satellite is described. The antenna elements may be dynamically selected based at least in part on a location and motion of the satellite receiver (such as in an automobile), and a location and a motion of at least the satellite that provides wireless signals. Moreover, the antenna elements may also be dynamically selected based at least in part on utilization and/or availability of a terrestrial wireless communication network that communicates with the satellite receiver. The satellite receiver may predict availability of communication with at least the satellite. In some embodiments, the antenna elements may be dynamically selected based at least in part on utilization of at least the satellite. Furthermore, the array of antenna elements may provide improved power efficiency, pointing accuracy and/or isotropic gain relative to an array of antenna elements without switched antenna elements, such as for carrier frequencies in the V band of frequencies or the W band of frequencies.

By utilizing dynamically switched antenna elements, these communication techniques may enable high-date-rate communication in the V band of frequencies and/or the W band of frequencies. Notably, the antenna elements may provide a compact, low-cost, configurable solution for communicating with the satellite using the V band of frequencies and/or the W band of frequencies. Moreover, the satellite receiver may have an increased receiving capability in the V band of frequencies and/or the W band of frequencies. Consequently, the communication techniques may provide improved communication performance (e.g., in mobile applications, such as land vehicular mobility), which may improve the customer experience when using the satellite receiver, the satellite and/or a communication system that includes the satellite receiver and the satellite.

In a third group of embodiments, a satellite is described. This satellite may have a set of antenna elements with predefined directions (which may be different from each other) and predefined beam angles (which may also be different from each other). Moreover, the satellite may dynamically select at least a given antenna element based at least in part on utilization and/or availability of a terrestrial wireless communication network in a region on a surface of the Earth used by an electronic device that communicates with the satellite. The satellite may change its attitude based at least in part on the given antenna element, where the changed attitude positions the region in a predefined beam angle of the given antenna element. Furthermore, the satellite may dynamically select the region to which it transmits wireless signals (e.g., by selecting the given antenna element and changing its attitude). For example, the region may be selected based at least in part on weather conditions associated with the region and/or priority of content conveyed by the wireless signals. Alternatively, the satellite may receive information specifying the region, the utilization and/or the availability of the terrestrial wireless communication network in the region.

By dynamically selecting the antenna and, thus, the region, these communication techniques may enable high-date-rate communication in the V band of frequencies and/or the W band of frequencies. Notably, the antenna and, thus, the regional coverage provided by the satellite may be dynamically adapted, e.g., based at least in part on one or more conditions (such as the utilization and/or the availability of the terrestrial wireless communication network) and/or the weather conditions. Consequently, the communication techniques may provide adaptation to maintain or improve communication performance (e.g., in mobile applications, such as land vehicular mobility), which may improve the customer experience when using a satellite receiver, the satellite and/or a communication system that includes the satellite receiver and the satellite.

We now describe some embodiments of the communication techniques. In the discussion that follows, one or more satellites (in a satellite constellation) may communicate with an electronic device associated with a user (such as a satellite receiver associated with an individual). This communication may be unidirectional or bidirectional. Moreover, the communication may occur (e.g., may involve one or more carrier frequencies) in one or more bands of frequencies. For example, the one or more bands of frequencies may include: an L band of frequencies (1-2 GHz), an S band of frequencies (2-4 GHz), a C band of frequencies (4-8 GHz), an X band of frequencies (8-12 GHz), a Ku band of frequencies (12-18 GHz), a K band of frequencies (18-27 GHz), a Ka band of frequencies (27-40 GHz), a V band of frequencies (40-75 GHz), and/or a W band of frequencies (75-100 GHz). Note that the communication with the one or more satellites may use one or more satellite communication protocols.

Moreover, in the discussion that follows Long Term Evolution or LTE (from the 3rd Generation Partnership Project of Sophia Antipolis, Valbonne, France) is used as an illustration of a data communication protocol that is used one or more radio nodes in a cellular-telephone network (which is an example of a terrestrial wireless communication network). The one or more radio nodes may facilitate communication between a computer (or a server) and the electronic device associated with the user. Consequently, the one or more radio nodes may include an Evolved Node B (eNodeB) or eNBs. In some embodiments, the communication protocol used by the one or more radio nodes may include: a third generation or 3G communication protocol, a fourth generation or 4G communication protocol, e.g., LTE, LTE Advanced or LTE-A, a fifth generation or 5G communication protocol, or other present or future developed advanced cellular communication protocol. Therefore, in other embodiments the one or more radio nodes may include: a Universal Mobile Telecommunications System (UMTS) NodeB and radio network controller (RNC), or a New Radio (NR) gNB or gNodeB (which communicate with a network with a cellular-telephone communication protocol that is other than LTE).

Alternatively or additionally, an Institute of Electrical and Electronics Engineers (IEEE) 802.11 standard (which is sometimes referred to as 'Wi-Fi,' from the Wi-Fi Alliance of Austin, Texas) is used as an illustration of a communication protocol that is used by an access point in a wireless local area network or WLAN (which is another example of a terrestrial wireless communication network) to facilitate the communication between the computer (or the server) and the electronic device. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. However, a wide variety of communication techniques or protocols may be readily used in various embodiments. For example, an electronic device and a radio node or an access point may communicate frames or packets in accordance with a wireless communication protocol, such as: Bluetooth (from the Bluetooth Special Interest Group of Kirkland, Washington), and/or another type of wireless interface.

Furthermore, a radio node or the access point may communicate with other access points, radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication in a region 106 with one or more electronic devices 110 (such as cellular telephones, portable electronic devices, stations or clients, another type of electronic device, etc.) via a cellular-telephone network 114 (which may include a base station 108), one or more access points 116 (which may communicate using Wi-Fi) in a WLAN, one or more radio nodes 118 (which may communicate using LTE) in a small-scale network (such as a small cell), and/or one or more satellites 120 (which may communicate in a V band of frequencies and/or a W band of frequencies). In the discussion that follows, an access point, a radio node, a base station or a satellite are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that base station 108, access points 116 and/or radio nodes 118 may communicate with each other and/or computer 112 (which may be a cloud-based computer or server, e.g., a mobile management entity for cellular-telephone network 114, a controller for the WLAN or a source of content) using a wired communication protocol (such as Ethernet) via network 122 and/or 124. Note that networks 122 and 124 may be the same or different networks. For example, networks 120 and/or 122 may an LAN, an intra-net or the Internet.

Moreover, electronic devices 110 may, concurrently or separately from communication with base station 108, access points 116 and/or radio nodes 118, may communicate with the one or more satellites 120. As noted previously, this communication may be unidirectional or bidirectional. In addition, computer 112 may communicate with the one or more satellites 120, e.g., using transceiver 126. This transceiver may communicate information with a given one of the one or more satellites 120 using unidirectional or bidirectional communication. For example, the information may include content addressed to or intended for electronic devices 110, and/or may specify: utilization of a terrestrial wireless communication network (such as cellular-telephone network 114, the WLAN, a small cell, etc.), availability of the terrestrial wireless communication network, weather conditions in region 106, utilization of the one or more satellites 120, and/or additional information. Moreover, the communication between transceiver 126 and the one or more satellites 120 may use the same band(s) of frequencies as the communication between the one or more satellites 120 and electronic devices 110. Alternatively, the communication between transceiver 126 and the one or more satellites 120 may use different band(s) of frequencies as the communication between the one or more satellites 120 and electronic devices 110.

Figure 16:
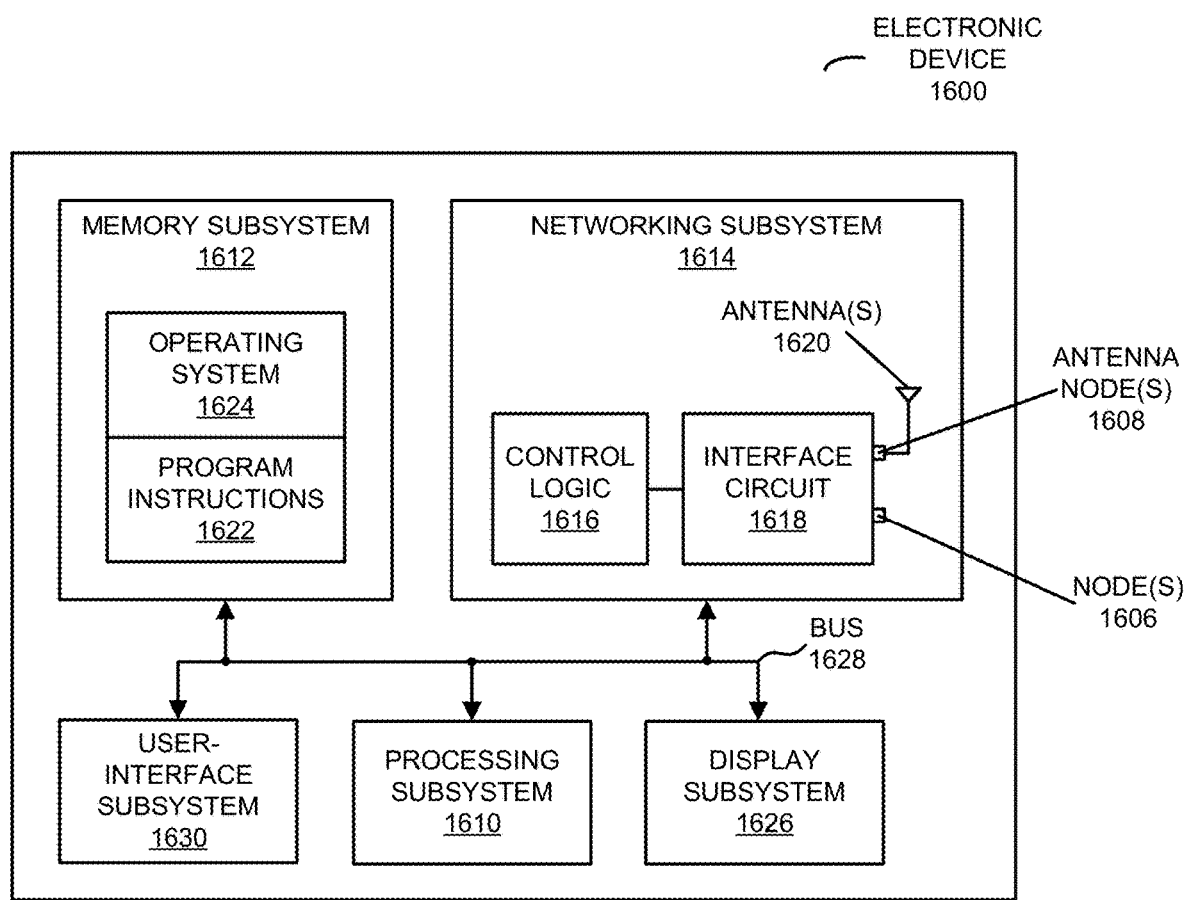
FIG. 16 is a block diagram illustrating an example of an electronic device in accordance with an embodiment of the present disclosure.

As described further below with reference to FIG. 16, base station 108, electronic devices 110, computer 112, access points 116, radio nodes 118 and satellites 120 may include subsystems, such as a networking subsystem, a memory subsystem and a processor subsystem. In addition, base station 108, electronic devices 110, access points 116, radio nodes 118 and satellites 120 may include radios 128 (or transceivers) in the networking subsystems. More generally, base station 108, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, base station 108, access points 116 and/or radio nodes 118 may wired communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads). Alternatively or additionally, base station 108, electronic devices 110, access points 116, radio nodes 118 and/or satellites 120 may wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 130 (represented by a jagged line) may be transmitted by radios 128 in, e.g., access points 116 and/or radio nodes 118 and electronic devices 110. For example, radio 124-1 in access point 116-1 may transmit information (such as one or more packets or frames) using wireless signals 128. These wireless signals are received by radios 128 in one or more other electronic devices (such as radio 128-2 in electronic device 110-1). This may allow access point 116-1 to communicate information to other access points 116 and/or electronic device 110-1. Note that wireless signals 130 may convey one or more packets or frames.

In some embodiments, wireless communication between components in FIG. 1 using wireless signals 130 have carrier frequencies in one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Alternatively or additionally, wireless signals 132 (represented by a jagged line) may be transmitted by one or more transmitters in one or more of satellites 120 (or may be received by one or more receivers in one or more of satellites 120 from transceiver 126). For example, one of satellites 120 may transmit information (such as one or more packets or frames) using wireless signals 132. These wireless signals are received by radios 128 in one or more other electronic devices (such as radio 128-2 in electronic device 110-1). This may allow the one of satellites 120 to communicate information to electronic device 110-1. Note that wireless signals 132 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 128 are shown in components in FIG. 1, one or more of these instances may be different from the other instances of radios 128.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to provide high-data-rate communication via satellites, e.g., in densely populated regions, because of congestion. In principle, less-congested bands of frequencies having shorter wavelengths, such as the V band of frequencies or the W band of frequencies, may offer a solution to these problems. However, because of effects such as atmospheric losses, it may be difficult to provide high-data-rate communicate using bands of frequencies having shorter wavelengths. Moreover, it may also be difficult to provide a low-cost, compact and flexible or configurable satellite receiver having improved receiving capabilities for use in communicating with satellites operating in bands of frequencies having shorter wavelengths.

Figure 8:
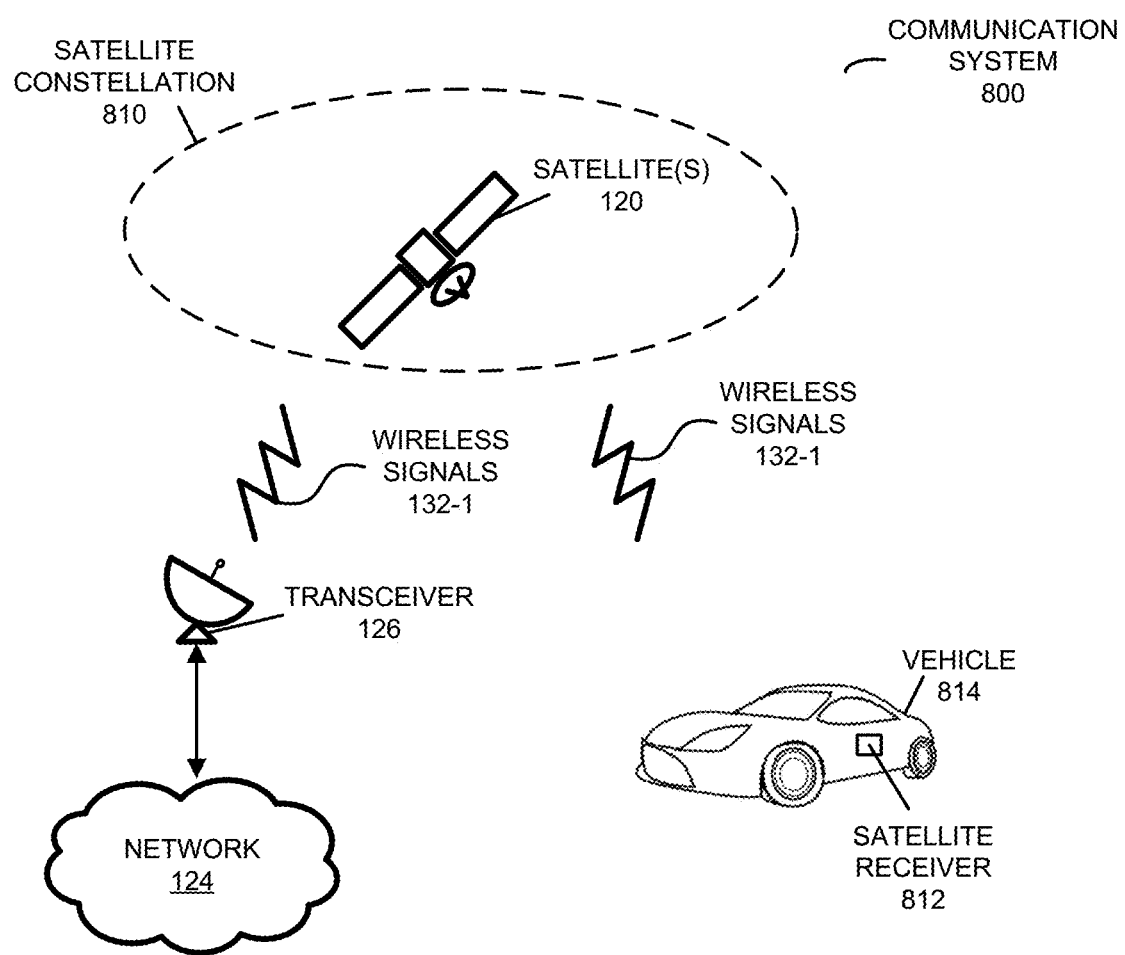
FIG. 8 is a drawing illustrating an example of a communication system in accordance with an embodiment of the present disclosure.
Figure 9:
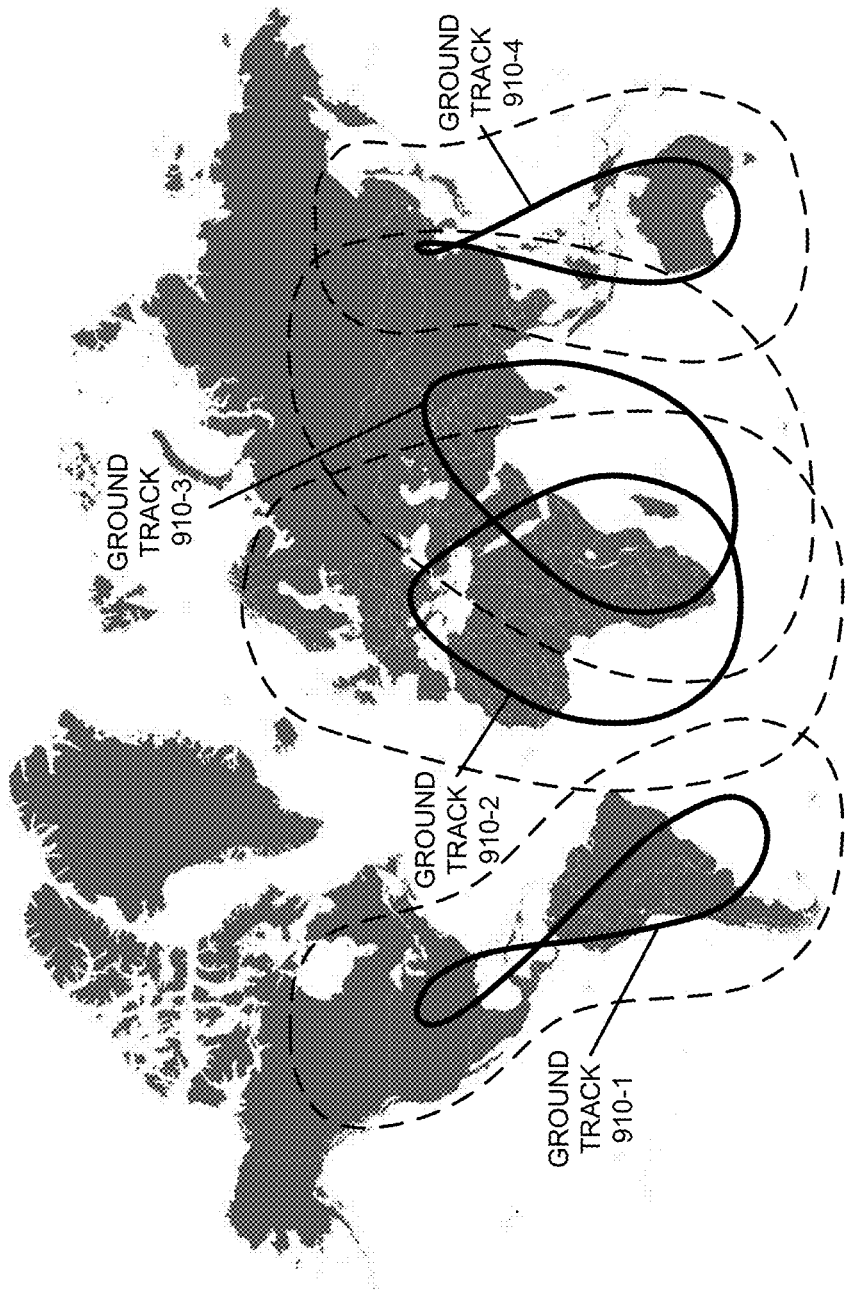
FIG. 9 is a drawing illustrating an example of a communication system showing ground tracks of satellites having eccentric orbits in accordance with an embodiment of the present disclosure.

As described further below with reference to FIGS. 2-15, in order to address these problems, a communication system may include one or more satellites 120 that transmit wireless signals having one or more carrier frequencies in the V band of frequencies or the W band of frequencies. As shown in FIG. 9, a given one of the one or more satellites 120 may have an eccentric geosynchronous or near-geosynchronous orbit that is inclined relative to an equatorial plane of the Earth, such as an eccentricity between 0.12 and 0.3. In the present discussion, note that, in a 'geosynchronous orbit,' a satellite may match the angular velocity associated with rotation of the Earth, and in a 'near-geosynchronous orbit' a satellite may have an angular velocity that is within 5, 10, 20 or 25% of the angular velocity associated with rotation of the Earth.

Consequently, the transmitted wireless signals may have a high elevation angle, such as elevation angles with magnitudes greater than 62°. This may reduce the path length and, thus, path losses (such as atmospheric losses) of a link between a given one of the one or more satellites 120 and a satellite receiver (such as radio 128-2 in electronic device 110-1). Therefore, the use of eccentric geosynchronous or near-geosynchronous orbits for satellites 120 may improve the receiving capabilities of the satellite receiver, which may allow the satellite receiver to receive the wireless signals at high data rate (such as a date rate of at least 50 Mbps).

Furthermore, in order to increase the number of satellite receivers that can receive the wireless signals (and, thus, the number of users of the communication system), the one or more satellites 120 may have ground tracks substantially along one or more continents, and may be in view of dense population regions in the one or more continents with a higher frequency than low-density population regions in the one or more continents. In the present discussion, note that a 'dense population region' may have a population density greater than 142 persons/mile$^2$ (such as 500 persons/mile$^2$), and a 'low-density population region' may have a population density less than 142 persons/mile$^2$. In addition, in the present discussion, note that 'substantially along a continent' may include a ground track that is more than 65, 75 or 85% above the continent.

In order to reduce the cost and size of the satellite receiver, and to further improve the receiving capabilities, the satellite receiver may include a switchable array of antenna elements for receiving the wireless signals from at least one of the one or more satellites 120. These antenna elements may have associated predefined fields of view, at least two of which are different from each other. Thus, the satellite receiver may select different antenna elements to receive the wireless signals from different satellites in the one or more satellites 120 and/or may dynamically track one of the one or more satellites 120. Notably, the satellite receiver may dynamically select the antenna elements based at least in part on a location and motion of the satellite receiver (such as latitude and longitude of the satellite receiver in an automobile), and a location and a motion of at least one of the one or more satellites 120 that provides wireless signals (which may be predefined). For example, using the predefined location and motion of at least one of the one or more satellites 120, the satellite receiver may predict when at least the satellite is in view of one of the antenna elements. This information may allow the satellite receiver to select an antenna element when the one of the one or more satellites 120 is in view or is within the predefined field of view of the antenna element.

Then, the satellite receiver may provide control signals to at least one switch to selectively couple to at least a selected antenna element, and may receive the wireless signals from at least a corresponding one of the one or more satellites 120.

Note that the pass loss may depend on the elevation angle of at least the one of the one or more satellites 120 (and, thus, on a central direction in the predefined field of view of the selected antenna element). Therefore, the satellite receiver may predict a data rate of communication with at least the one of the one or more satellites 120 based at least in part on the selected antenna element.

While the preceding discussion illustrated the dynamic selection of one of the antenna elements based at least in part on relative location and motion of the satellite receiver and at least one of the one or more satellites 120, more generally a wide variety of factors may be used in the selection process. For example, electronic device 110-1 that includes the satellite receiver may selectively have unidirectional or bidirectional communication with a terrestrial wireless communication network (such as cellular-telephone network 114, the WLAN, a small cell, etc.), and the antenna element may be dynamically selected based at least in part on utilization and/or availability of the terrestrial wireless communication network. Alternatively or additionally, the antenna element may be dynamically selected based at least in part on utilization of at least one of the one or more satellites 120. In some embodiments, the antenna element may have an associated data rate of communication with at least the satellite (e.g., based at least in part on the elevation angle associated with the central direction in predefined field of view of the antenna element), so that the antenna element may be dynamically selected based at least in part on a priority of content conveyed by the wireless signals (e.g., depending on the priority of the content, the antenna element may be dynamically selected in order to provide a suitable minimum data rate). Note that the priority of the content may be specified by an access category (such as voice, video, best effort or background) or another indication (such as high priority or low priority).

Furthermore, while the preceding discussion used communication with one of the one or more satellites 120 as an illustration, in other embodiments the selected antenna element may concurrently receive wireless signals from at least two of satellites 120. The concurrent communication may allow the satellite receiver to receive different data streams. Alternatively or additionally, the concurrent communication may provide redundancy of the communicated information. This may allow the satellite receiver to continue to receive the information when one of the links with the satellites 120 fades, or to compare packets or frames received in two links with different satellites, so that errors can be detected and/or corrected.

Note that the use of switched antenna elements in the satellite receiver may provide improved power efficiency, pointing accuracy and/or isotropic gain relative to an antenna or an array of antenna elements without switched antenna elements (such as a beam-tacking or phased array of antennas or antenna elements), e.g., in the V band of frequencies and/or the W band of frequencies.

In some embodiments, the one or more satellites 120 may include a set of antenna elements with predefined directions (which may be different from each other) and predefined beam angles (which may also be different from each other). Moreover, one of the one or more satellites 120 may dynamically select at least one of the antenna elements based at least in part on utilization and/or availability of the terrestrial wireless communication network in region 106 used by electronic device 110-1 that communicates with at least one of the one or more satellites 120. Furthermore, the one of the one or more satellites 120 may change its attitude based at least in part on the selected antenna element, where the changed attitude positions region 106 in a predefined beam angle of the antenna element.

While the preceding discussion illustrated the dynamic selection of one of the antenna elements based at least in part on the utilization and/or the availability of the terrestrial wireless communication network, more generally a wide variety of factors may be used in the selection process. For example, the one of the one or more satellites 120 may dynamically select region 106 to which it transmits wireless signals (e.g., by selecting the antenna element and changing its attitude). This selection may be based at least in part on weather conditions associated with region 106 and/or priority of content conveyed by the wireless signals. Thus, in some embodiments, the one of the one or more satellites 120 may receive information specifying region 106, the utilization the terrestrial wireless communication network in the region, the availability of the terrestrial wireless communication network in the region, and/or the weather conditions.

Note that the use of antenna elements in the one of the one or more satellites 120 may provide improved communication performance. For example, the one of the one or more satellites 120 may include a power amplifier that transmits wireless signals having carrier frequencies in a V band of frequencies and/or a W band of frequencies and power greater than 75 W, and that has a DC RF power conversion efficiency exceeding a predefined value.

In these ways, the communication techniques may provide a low-cost, compact and flexible or configurable satellite receiver and communication system with improved receiving capability and communication performance. These capabilities may allow the communication system to have high data rates in links between the one or more satellites 120 and electronic devices 110, e.g., in the V band of frequencies and/or the W band of frequencies. Moreover, the communication with the one or more satellites 120 may complement or may supplement communication with a terrestrial wireless communication network. Consequently, the communication techniques may provide improved communication performance (e.g., in mobile applications), which may improve the customer experience when using the satellite receiver, the one or more satellites 120 and/or a communication system that includes the satellite receiver and the one or more satellites 120.

Figure 2:
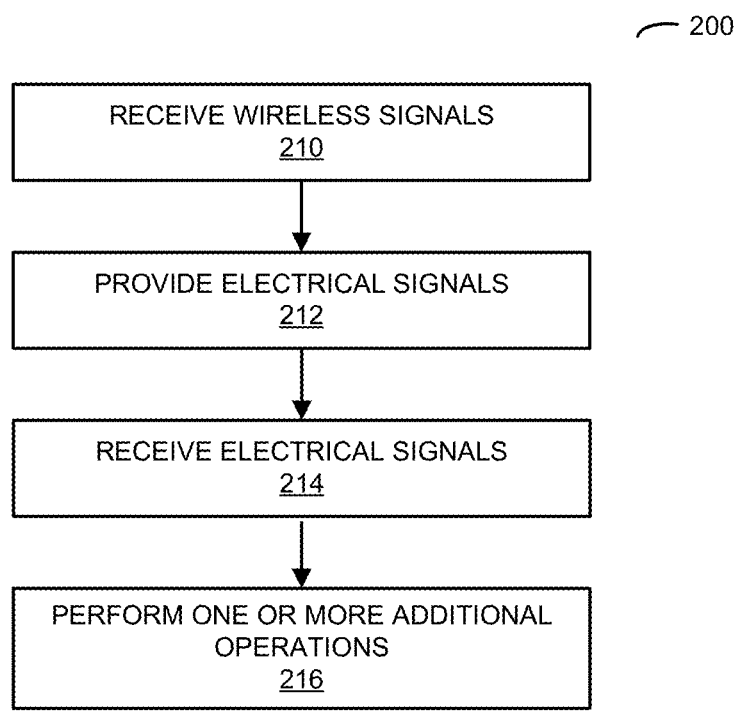
FIG. 2 is a flow diagram illustrating an example of a method for receiving electrical signals using an electronic device in FIG. 1 in accordance with an embodiment of the present disclosure.

We now describe embodiments of the method in the communication techniques. FIG. 2 presents a flow diagram illustrating an example of a method 200 for receiving electrical signals, which may be performed by a satellite receiver in an electronic device (such as electronic device 110-1 in FIG. 1). During operation, the electronic device may receive, using one or more antenna elements, wireless signals (operation 210) associated with one or more satellites. Note that a given antenna element in the one or more antenna elements may have a magnitude of an elevation angle exceeding a predefined value (such as 62°). For example, the minimum elevation angle may be 66° with 4° of margin to account for the maximum gradient of highways, which results in the predefined value of 62°. This may correspond to the one or more antenna elements providing a full-cone coverage angle of 56° (i.e., 2×28°). Furthermore, the one or more satellites may have eccentric geosynchronous or near-geosynchronous orbits that are inclined relative to an equatorial plane of the Earth (such as an eccentricity between 0.12 and 0.3). Additionally, the one or more satellites may have ground tracks substantially along one or more continents, and may be in view of first population regions in the one or more continents with a higher frequency than second population regions in the one or more continents.

Then, the electronic device may provide, from the one or more antenna elements, the electrical signals (operation 212) corresponding to the wireless signals, where the electrical signals have carrier frequencies in a V band of frequencies or a W band of frequencies. Moreover, the electronic device may receive, using an integrated circuit, the electrical signals (operation 214), where the electrical signals convey information at a data rate exceeding a second predefined value (such as 50 Mbps). For example, a given beam from a satellite may provide a data rate of 50-200 Mbps.

In some embodiments, the electronic device may optionally perform one or more additional operations (operation 216). For example, the electronic device may concurrently communicate with two or more satellites.

Note that the first population regions may have population densities exceeding a third predefined value (such as 142 persons/mile$^2$) and the second population regions may have population densities below the third predefined value.

Figure 3:
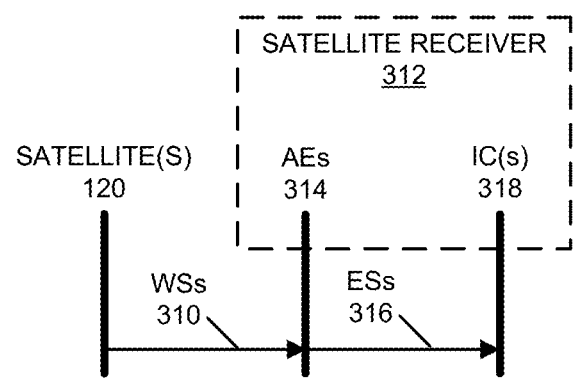
FIG. 3 is a drawing illustrating an example of communication between one or more satellites and an electronic device in FIG. 1 in accordance with an embodiment of the present disclosure.

Embodiments of the communication techniques are further illustrated in FIG. 3, which presents a drawing illustrating an example of communication among one or more of satellites 120 and electronic device 110-1. In FIG. 3, one or more of satellites 120 may provide wireless signals (WSs) 310. These wireless signals may be received by one or more antenna elements (AEs) 314 in a satellite receiver 312 in electronic device 110-1. Then, the one or more antenna elements 314 may provide electrical signals (ESs) 316 corresponding to wireless signals 310 to one or more integrated circuits (ICs) 318 in electronic device 110-1, which further process electrical signals 316.

Figure 4:
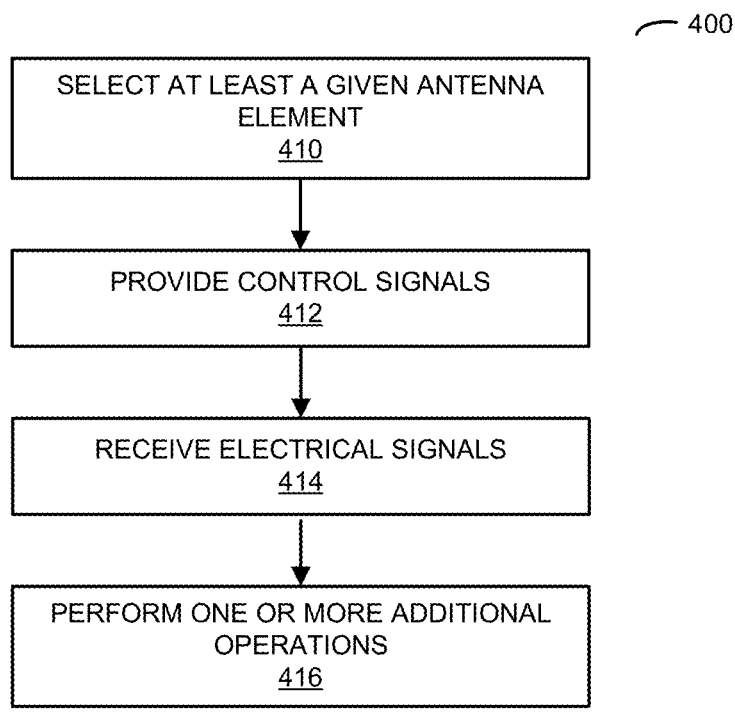
FIG. 4 is a flow diagram illustrating an example of a method for receiving electrical signals using an electronic device in FIG. 1 in accordance with an embodiment of the present disclosure.

FIG. 4 presents a flow diagram illustrating an example of a method 400 for receiving electrical signals, which may be performed by a satellite receiver in an electronic device (such as electronic device 110-1 in FIG. 1). During operation, the electronic device may dynamically select at least a given antenna element (operation 410) in an array of antenna elements based at least in part on a location and motion of the electronic device (such as a longitude and a latitude of the electronic device), and a location and motion of at least a satellite (which may be predefined). Note that the array of antenna elements may have associated predefined fields of view configured to receive wireless signals associated with at least the satellite and to provide the corresponding electrical signals. Moreover, at least two of the antenna elements in the array of antenna elements may have different predefined fields of view.

For example, the array of antenna elements may include 16 antenna elements. Each of the antenna elements may have a central direction in an associated predefined field of view, and may have a fixed gain of 30-33 dBi.

Then, the electronic device may provide control signals (operation 412) to at least one of one or more switches to selectively couple to at least the given antenna element, where the one or more switches selectively couple to antenna elements in the array of antenna elements. Note that the one or more switches may be mechanical switches or electronic switches.

Next, the electronic device may receive, via the given antenna element and one or more integrated circuits, the electrical signals (operation 414).

In some embodiments, the electronic device may optionally perform one or more additional operations (operation 416). For example, the electronic device may selectively communicate with a terrestrial wireless communication network. This communication with the terrestrial wireless communication network may be bidirectional. Moreover, the given antenna element may be dynamically selected based at least in part on utilization and/or availability of the terrestrial wireless communication network. In this way, the communication techniques may support or supplement communication of a high-utilization and/or a low-availability terrestrial wireless communication network (e.g., the communication with at least the satellite may enable load-balancing with the terrestrial wireless communication network), Furthermore, the electronic device may selectively accept or reject receiving of content conveyed by the electrical signals. For example, low priority content may be rejected, while high priority content may be accepted. Alternatively, the content may be broadcast by the satellite, and the electronic device may have the intelligence to determine whether the content is needed by the electronic device and should be accepted.

Additionally, the electronic device may predict availability of communication with at least the satellite. For example, the electronic device may predict the availability based at least in part on the predefined location and motion of at least the satellite, which may allow the electronic device to determine when at least the satellite is in view or is within a predefined field of view of the given antenna element.

In some embodiments, the electronic device may predict a data rate of communication with at least the satellite based at least in part on the given antenna element. For example, if the given antenna element is associated with a high elevation angle (and, thus, reduced atmospheric loss), the predicted data rate may be higher than another antenna element that is associated with a lower elevation angle.

Moreover, the given antenna element may be dynamically selected based at least in part on utilization of at least the satellite. For example, when there is high utilization, the selected given antenna element may have a lower data rate. Alternatively, when there is low utilization, the selected given antenna element may have a higher data rate.

Furthermore, the given antenna element may have an associated data rate of communication with at least the satellite and the given antenna element may be dynamically selected based at least in part on a priority of content conveyed by the electrical signals. For example, for high priority content, the selected given antenna element may be associated with a high elevation angle, which has reduced path loss and, thus, a higher data rate.

Additionally, the electronic device may concurrently receive second electrical signals associated with a second satellite, and the electrical signals and the second electrical signals may provide: redundancy of communicated information, and/or communicate different data streams. For example, concurrent data streams with partial or fully redundant information may be compared to correct errors or dropouts. Alternatively or additionally, concurrent data streams with partial or fully redundant information may provide robust or resilient communication when there is fade out of a given link between the electronic device and a given satellite.

In some embodiments, the wireless signals may have carrier frequencies in V band of frequencies and/or a W band of frequencies, and the array of antenna elements may have improved power efficiency, pointing accuracy and/or isotropic gain relative to an array of antenna elements without switched antenna elements.

Note that the antenna elements in the array of antenna elements may be non-planar. This may allow the array of antenna elements to be conformally placed along a curved or non-planar surface, such as the roof or trunk of an automobile.

Figure 5:
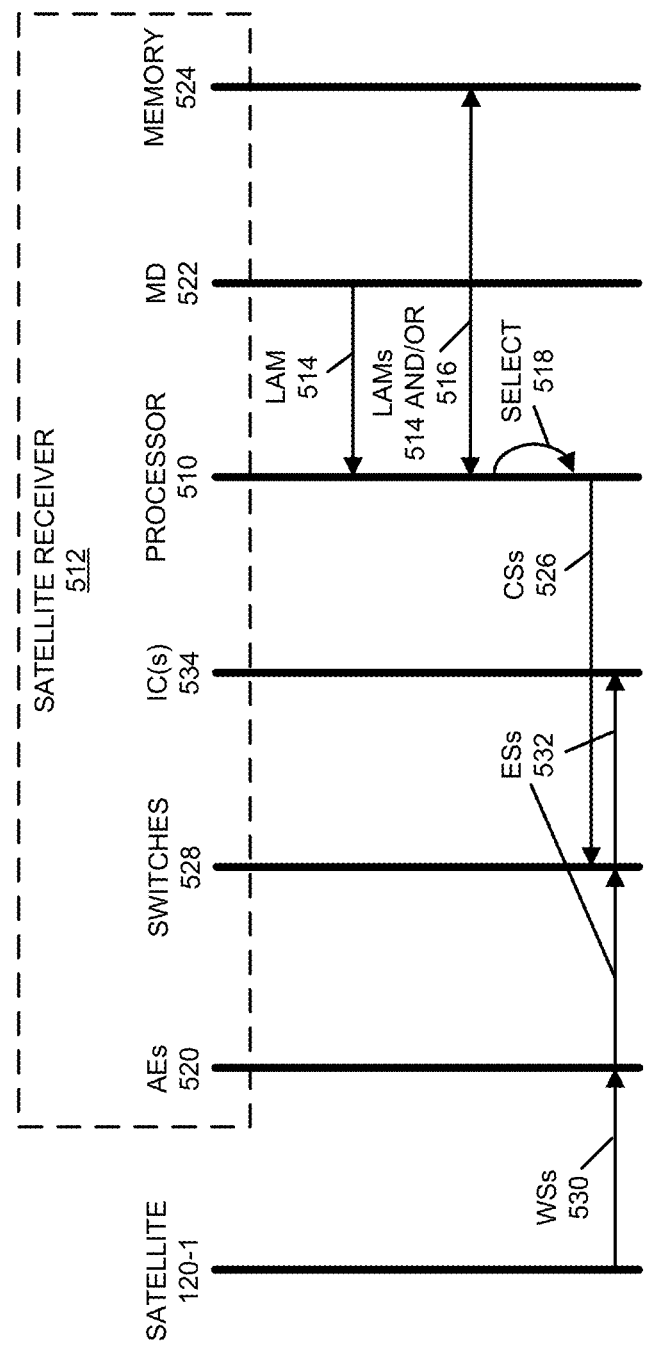
FIG. 5 is a drawing illustrating an example of communication between a satellite and an electronic device in FIG. 1 in accordance with an embodiment of the present disclosure.

Embodiments of the communication techniques are further illustrated in FIG. 5, which presents a drawing illustrating an example of communication between satellite 120-1 and electronic device 110-1. In FIG. 5, processor 510 in a satellite receiver 512 in electronic device 110-1 may dynamically select 518 at least a given antenna element in an array of antenna elements (AEs) 520 in electronic device 110-1 based at least in part on a location and motion (LAM) 514 of electronic device 110-1, and a location and motion (LAM) 516 of satellite 120-1. Note that location and motion 514 may be provided by a measurement device (MD) 522 in electronic device 110-1, such as a GPS sensor and/or another type of position sensor (e.g., a position sensor that determines location and/or motion using a cellular telephone network, a WLAN, a local positioning system, trilateration, triangulation, etc.). Alternatively or additionally, location and motion 516 may be predefined, and information specifying location and motion 516 may be stored in memory 524 in electronic device 110-1, which is accessed by processor 510.

Then, processor 510 may provide control signals (CSs) 526 to at least one of one or more switches 528 in electronic device 110-1 to selectively couple to at least the given antenna element. Moreover, satellite 120-1 may transmit wireless signals (WSs) 530. These wireless signals may be received by at least the given antenna element, which provides electrical signals (ESs) 532 corresponding to wireless signals 530 to one or more integrated circuits (ICs) 534 in electronic device 110-1, which may further process electrical signals 532.

Figure 6:
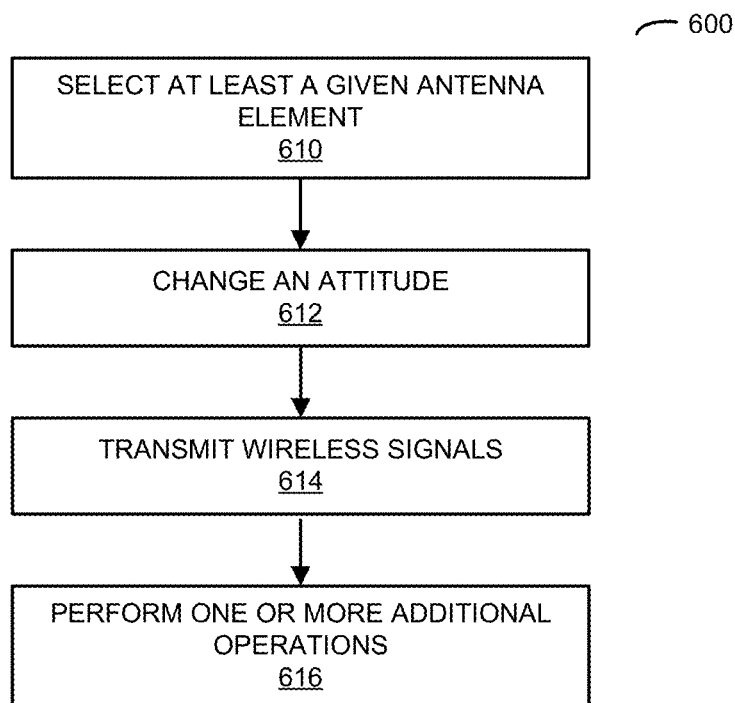
FIG. 6 is a flow diagram illustrating an example of a method for transmitting wireless signals using a satellite in FIG. 1 in accordance with an embodiment of the present disclosure.

FIG. 6 presents a flow diagram illustrating an example of a method 400 for transmitting wireless signals, which may be performed by a satellite (such as one of satellites 120 in FIG. 1). During operation, the satellite may dynamically select at least a given antenna element (operation 610) in a set of antenna elements based at least in part on one of: utilization of a terrestrial wireless communication network used by the electronic devices; and/or availability of the terrestrial wireless communication network. Note that the set of antenna elements may have associated predefined directions and predefined beam angles, and at least two antenna elements in the set of antenna elements may have at least one of: different predefined directions, and/or different predefined beam angles. In some embodiments, the set of antenna elements may include 1-8 antenna elements.

Then, the satellite may change an attitude (operation 612) of the satellite based at least in part on the given antenna element, where the changed attitude positions a region on a surface of the Earth in a predefined beam angle of the given antenna element. Next, the satellite may transmit, using one or more integrated circuits and via the given antenna element, the wireless signals (operation 614) to electronic devices in the region.

In some embodiments, the satellite may optionally perform one or more additional operations (operation 616). For example, when the at least two antenna elements have different predefined beam angles, the at least two antenna elements may have different associated data rates of communication. Notably, wider beam angles may result in a lower average elevation angle for the wireless signals and, thus, increased atmospheric loss, as well as a reduced average power, which may reduce the data rate. Alternatively, narrower beam angles may result in a higher average elevation angle for the wireless signals and, thus, decreased atmospheric loss, as well as increased average power, which may increase the data rate.

Moreover, the satellite may dynamically select the region. For example, the region may be dynamically selected based at least in part on weather conditions associated with the region. Notably, rain or cloud cover may scatter or absorb the wireless signals, so the satellite may select a region with reduced or no cloud cover or rain for improved communication performance. Alternatively or additionally, the given antenna element may be dynamically selected based at least in part on weather conditions associated with the region. For example, an antenna element with a higher average elevation angle may be used when there is rain or cloud cover in the region.

Furthermore, the satellite may receive information specifying the region, the utilization of the terrestrial wireless communication network, the availability of the terrestrial wireless communication network, and/or the weather conditions in one or more regions.

In some embodiments, the given antenna element may be dynamically selected based at least in part on a priority of content conveyed by the wireless signals. For example, when the content has a higher priority, the selected given antenna element may have a higher average elevation angle and, thus, reduced atmospheric loss, which may increase the data rate.

Note that the electronic devices may be mobile.

Moreover, the satellite may include a power amplifier that transmits wireless signals having carrier frequencies in a V band of frequencies or a W band of frequencies and power greater than 75 W, and that has a DC RF power conversion efficiency exceeding a predefined value (such as 5% or 14%). Note that the power amplifier may be a solid-state power amplifier (SSPA), a travelling-wave tube amplifier (TWTA), and/or a microwave power module (MPM).

In some embodiments of method 200 (FIG. 2), 400 (FIG. 4) and/or 600 there may be additional or fewer operations. Furthermore, the order of the operations may be changed, and/or two or more operations may be combined into a single operation.

Figure 7:
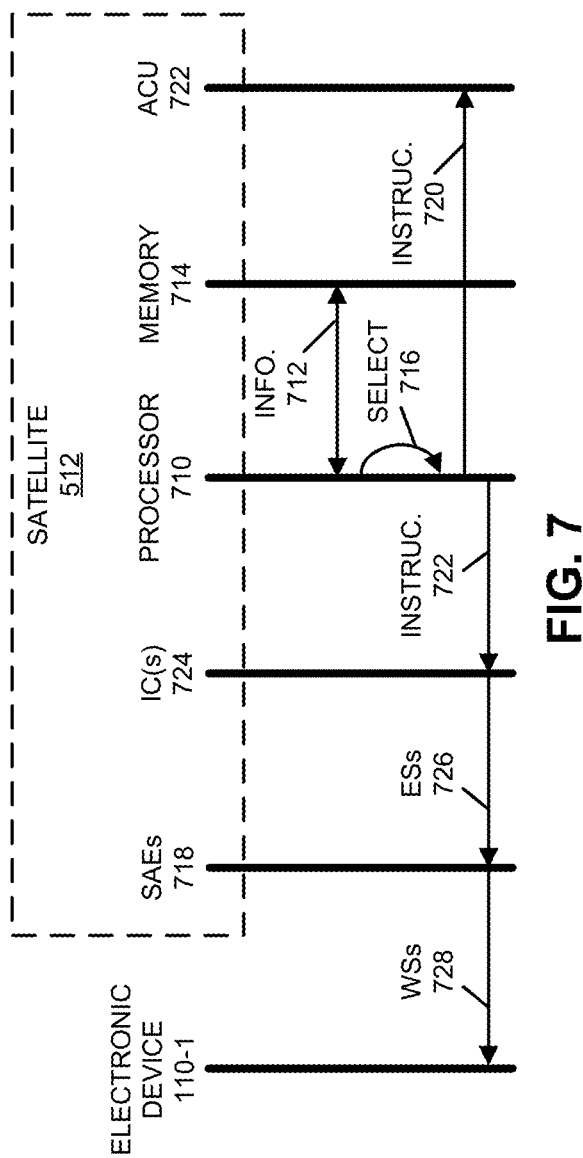
FIG. 7 is a drawing illustrating an example of communication between one or more satellites and an electronic device in FIG. 1 in accordance with an embodiment of the present disclosure.

Embodiments of the communication techniques are further illustrated in FIG. 7, which presents a drawing illustrating an example of communication between satellite 120-1 and electronic device 110-1. In FIG. 7, a processor 710 in satellite 120-1 may dynamically select 716 at least a given antenna element in a set of antenna elements (SAEs) 718 in satellite 120-1 based at least in part on information 712 stored in memory 714 in satellite 120-1, which is accessed by processor 710. For example, information 712 may include one or more of: utilization of a terrestrial wireless communication network used by electronic devices (such as electronic device 110-1), availability of the terrestrial wireless communication network, weather conditions in one or more regions on Earth, a priority of content, utilization of satellite 120-1, etc.

Then, processor 710 may instruct 720 an attitude control unit (ACU) 722 in satellite 120-1 to change an attitude of satellite 120-1 based at least in part on the given antenna element, where the changed attitude positions a region on a surface of the Earth in a predefined beam angle of the given antenna element. For example, attitude control unit 722 may include a reaction wheel. In response to instruction 720, attitude control unit 722 may change a rotation rate of the reaction wheel to change the attitude. In some embodiments, attitude control unit 722 may be solar-powered. This may allow the satellite to use fuel to maintain an orbit of the satellite.

Next, processor 710 may instruct 722 one or more integrated circuits (ICs) 724 in satellite 120-1 to transmit, by providing electrical signals (ESs) 726 to the given antenna element, wireless signals (WSs) 728 to electronic devices in the region. These wireless signals may be received by a satellite receiver in electronic device 110-1.

While FIGS. 3, 5 and 7 illustrate communication between components using unidirectional or bidirectional communication with lines having single arrows or double arrows, in general the communication in a given operation in these figures may involve unidirectional or bidirectional communication.

We now further describe embodiments of the communication techniques. In some embodiments, a satellite receiver may include an array of low-cost beam-switched antenna elements for communication with constellations of one or more satellites having high ground elevation angles. Notably, the satellite receiver may include a beam-switching antenna assembly system with multiple directive beamforming antenna elements arranged in an array. The satellite receiver may track one or more of the satellites by switching between these directive antenna elements. While these communication techniques may be applied to communication constellations with any orbital architecture, in some embodiments it may be used for communication with satellites having high ground elevation angles. Note that the antenna elements for use in a V band of frequencies and/or a W band of frequencies may have a small form-factor.

Moreover, the array of antenna elements in the satellite receiver may include a directive, tracking high-gain antenna or antenna element that is cheaper than a phased array beam-steering antenna or antenna element, and may be capable of working with modem satellites constellation in higher frequency band, such as the V band of frequencies and/or the W band of frequencies. These higher frequencies may enable higher data rates, smaller antennas or antenna elements, and narrow beams. However, electronically steered antennas, such as phased array antennas, are typically very expensive and difficult to implement for bands such as the V band of frequencies and/or the W band of frequencies. This problem may be addressed by the disclosed beam-switching array of antenna elements, which is directive and tracking, and can be implemented at low cost for use in the V band of frequencies and/or the W band of frequencies.

The disclosed communication techniques, including the antenna assembly, may provide several advantages. Notably, the antenna assembly and the disclosed communication techniques may: provide high gain (directivity) and tracking capabilities to compensate for satellite and antenna movement; be implemented in a flat or a curved design (so that they can follow the curvature of an automobile, such as a car roof, hood or trunk, which may allow the antenna assembly to easily installed on an automobile); have a small size of foot-print (which may be enabling for an array of antenna elements for use in the V band of frequencies and/or the W band of frequencies); have low cost (because it does not require mechanical steering or complicated and expensive electronical systems, such as phased array steering); avoids interference with other antennas or antenna elements for use with a terrestrial wireless communication network and/or satellite systems; allow communication to be simultaneously or concurrently established with two or more satellites; and/or work for communication with one or more satellites at high ground elevation angles.

In some embodiments, the antenna assembly may include an N×N array of directive antenna elements. In designing the antenna assembly, the objective may be to reduce or minimize the value of N, which having sufficient antenna elements to be able to view a typical 45° or π/4 radians solid angle of satellites at higher elevation angles by forming, e.g., in conjunction with each other, N beams in different directions each covering π/(4·N) solid angle cone. Moreover, the beam width from each of the antenna elements can close the link with a given satellite for specific applications. In principle, N equal to 1 is a possible configuration, but would require more power to close the link with wider beam. Alternatively, the cost of the antenna assembly increases in proportion to the value N.

As noted previously, the antenna assembly may include multiple directive beamforming antenna elements. The beams of the antenna elements may jointly cover the cone formed by the arc of constellation of satellites as the satellites move. Moreover, the antenna assembly may be used to track satellites by switching between the antenna elements, and accordingly between the beams. Furthermore, the antenna assembly may work for communication with satellites at high ground elevation angles. However, in some embodiments, the communication techniques may be used for communication with satellites at lower ground elevation angles, but this may increase the number of antenna elements N and, thus, the cost of the antenna assembly. Additionally, in some embodiments, the antenna assembly may be optimized for receive only. However, in other embodiments, the antenna elements may provide transmit functionality.

We now further describe the communication system and the satellite receiver. FIG. 8 presents a drawing illustrating an example of a communication system 800. Notably, content provided over network 124 (such as the Internet) may be transmitted by a satellite transmitter or transceiver 126 to one or more satellites 120 in a satellite constellation 810. Then, a given satellite may broadcast the content to electronic devices, such as a satellite receiver 812 in a vehicle 814 (such as an automobile). Note that communication system 800 may include: transceiver 126, one or more satellites 120 and/or one or more satellite receivers (such as satellite receiver 812).

Moreover, as shown in FIG. 9, which presents a drawing illustrating an example of a communication system showing ground tracks 910 of satellites 120 having eccentric orbits. The orbital trajectory of satellites 120 may more frequently achieve high satellite elevation angles (such as above 62° or 66°) with respect to more potential users. Notably, high ground elevation angles may be accomplished by using eccentric and inclined geosynchronous or near-geosynchronous orbits, such that ground tracks 910 of satellites 120 may closely follows more densely populated regions of the Earth. This can be useful for wireless signal communications, where there is a requirement for a high elevation angle in order to close the link, such as in cases where the user antenna is simple or the selected frequency experiences high levels of atmospheric loss or attenuation. In FIG. 8, ground tracks 910 for four such trajectories are shown. The dashed lines indicate regions where satellites 120 are in view more frequently with an elevation angle of greater than 62° or 66°. Note that the orbital trajectories of satellites 120 may vary in eccentricity from 0,12 to 0.30, and may vary in inclination from 38° to 46°. These values may ensure that satellites 120 are placed above densely populated regions more frequently and over unpopulated regions less frequently.

In mobile applications, the antenna assembly may be mounted on top of a vehicle having multiple beam-forming antenna elements. In the communication techniques, the antenna elements may be dynamically selected based at least in part on mobility of the vehicle and satellite movement.

While the communication techniques may be applied for use with automobiles, in other embodiments the communication techniques may be used with a wide variety of vehicles, such as trains, ships, aircraft, etc.

Figure 10:
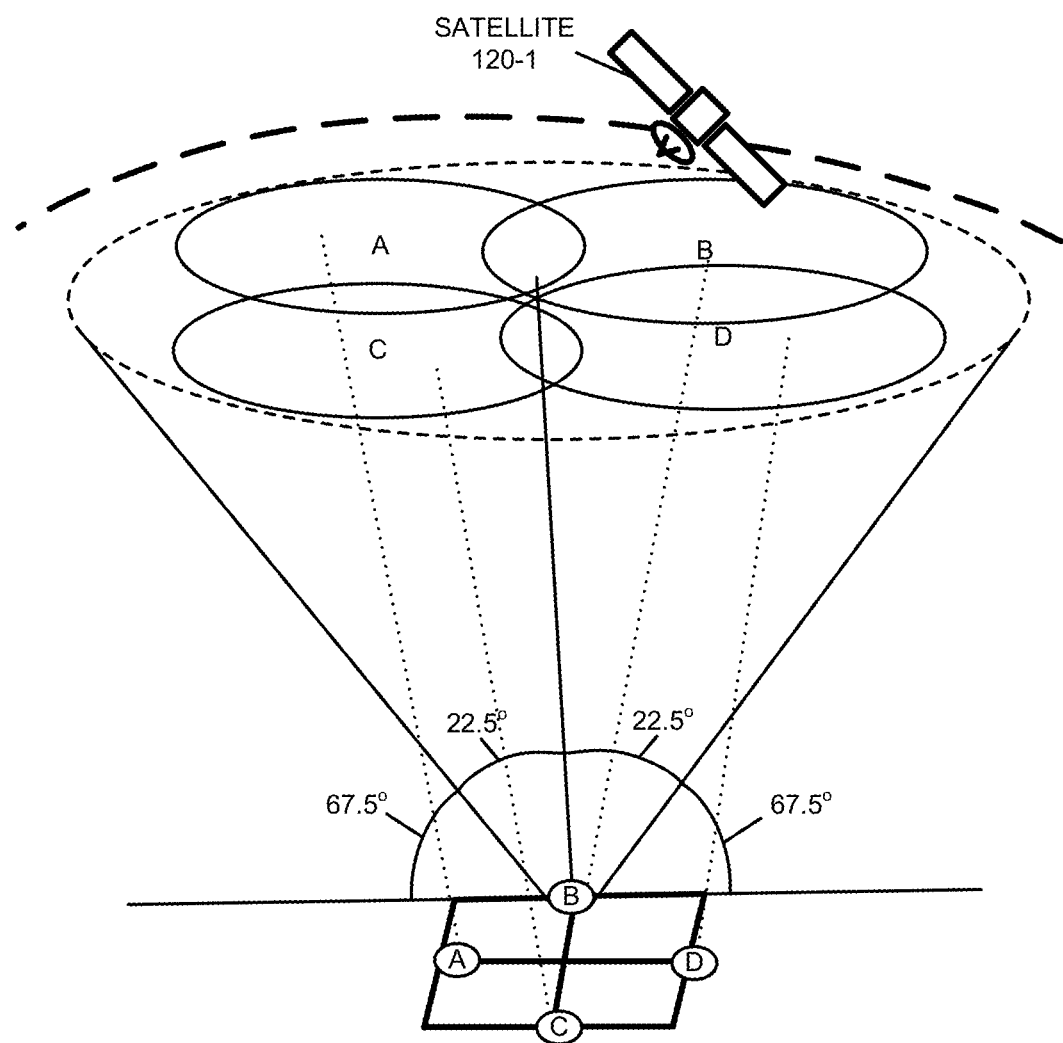
FIG. 10 is a drawing illustrating an example of an antenna and satellite geometry in accordance with an embodiment of the present disclosure.

FIG. 10 presents a drawing illustrating an example of an antenna and satellite geometry, including the coverage areas associated with the beams from antennas A, B, C and D. Notably, the satellite constellation may have a high elevation. The constellation may be designed to provide a continuous coverage service area with a minimum elevation angle from the ground close to 90°, such as elevation angles that are greater than 62°-75°. As noted previously, high elevation constellations may be beneficial for a beam-switching antenna assembly. For example, the satellite receiver may need to track satellites 120 in relatively small tracking cone (such as a solid angle Ω of 0.07-0.157π steradians), and the antenna assembly may include a small number of antenna elements with combined beams that covers this tracking cone. In some embodiments, the antenna assembly may include between 2×2=4 and 5×5=25 antenna elements and may provide directive gain between 20 and 30 dBi.

As shown in FIG. 10, for a minimal look angle of 67.5°, the satellite tracking cone may have solid angle of $$\Omega = \frac{4\pi}{26.3} \text{ or } \frac{1}{13.1}$$

of the entire upper hemisphere. For example, antenna assembly may include four beamforming antenna elements (e.g., in a 2×2 array) with four beams that totally cover the aforementioned satellite tracking cone. Consequently, at a given moment in time, if the satellite constellation provides several of satellites 120 within the satellite tracking cone, then one of the antenna elements may be able to communicate with one or more of satellites 120.

While the preceding discussion captures the working principles of the antenna assembly for use in receiving wireless signals from satellites 120, in other embodiments the antenna elements may be used for transmission. Thus, in some embodiments, one of the modes of antenna operation is a receive-only mode, including receiving of broadcast wireless signals. In this case, the complexity and cost of the antenna assembly may be reduced or minimized. Alternatively, if the antenna assembly is capable of bidirectional communication, the complexity and the cost of the antenna assembly may be increased.

As noted previously, while the communication techniques may be used for communication in a wide variety of bands of frequencies, the antenna assembly may have considerable benefits for communication in the V band of frequencies and/or the W band of frequencies. However, a higher frequency link between a satellite and satellite receiver may pose problems, including: noise, path loss, shadowing, and the Doppler effect. Moreover, a smaller wavelength may be more likely to be scattered when reflected by rough surfaces, which reduces multipath power. A high-elevation satellite constellation in conjunction with the beamforming directional array of antenna elements may achieve the desired link capacity considering high path loss and atmospheric loss of the millimeter-wave satellite communications.

Directional antennas may increase or maximize receiving in some directions, while suppressing receiving in other directions. As the communication techniques may use multiple directional antenna elements, this may result in picking up or receiving of extraneous or unwanted signals and interfere with the applications using the antennas elements. Therefore, it may be important to properly point or direct the multiple directional antenna elements.

As noted previously, the satellite constellation may include multiple satellites 120. The number of satellites 120 required for seamless and continuous coverage over regions of the surface of the Earth may depend on the design of the orbital trajectories. In some embodiments, at a given time, only one of satellites 120 is in the field of view. Alternatively, in other embodiments, at a given time, more than one of satellites 120 may be in view. Both of these scenarios are taken into consideration in the following discussion of the working principles of the antenna assembly. We first consider a single satellite view, and then consider when multiple satellites are in view.

The beam-switching antenna assembly may be fabricated as an array that includes multiple individual directive antenna elements. In the discussion that follows, assume that the antenna assembly includes an array with 2×2=4 antenna elements. Because of the use of higher frequency bands, the size of individual antenna elements may be very small. For example, in the W band of frequencies, a single antenna element with an apex full cone angle of 56° may have an area of about 0.25 cm$^2$ (0.5 cm×0.5 cm). A 7×7 array of antenna elements may have an area of around 529 cm$^2$ (23 cm×23 cm). Each of the 49 separate antenna elements may have a gain of up to 29 dBi and may still cover the same 45° apex full cone angle as the first antenna element, and may have the same or different directions. A 10×10 array may have an area of 2,209 cm$^2$ (47cm×47 cm) and each antenna element may have a gain of 32 dBi. Moreover, as noted previously, beam-steering (such as a phased array) may have high cost and, at the time of the present disclosure, may be unavailable in the V band of frequencies and/or the W band of frequencies. In the discussion that follows, options for how the antenna assembly can be used to track a single one of satellites 120 and to correct for mobility without beam-steering capability are described. However, these techniques may also be used in a multiple satellite mode.

In a single satellite mode, where the antenna assembly may have a connection with one satellite at a time, we first enumerate the options of how the antenna assembly can track satellites. Then, these options are described along with mathematical support.

In order to receive wireless signals, a directive antenna element in the array of antenna elements may form its own beam and may operate independently of the other antenna elements. Alternatively, multiple directive antenna elements may work collaboratively.

Moreover, there may be two options for activating the antenna elements. Notably, each of the antenna elements may always be active. Alternatively, the satellite receiver may predict the position of the satellite and may activate the antenna elements (e.g., by providing control signals to one or more switches) as required, which may reduce power consumption.

Furthermore, there may be several scenarios. In a first scenario, each of the directive antenna elements may form a beam independently of the other antenna elements and they may always be active. In a second scenario, each of the directive antenna elements may form a beam independently and they may be activated adaptively, as needed. In a third scenario, multiple directive antennas elements may work together to boost the gain when the satellite location is at the edge of beams produced by the multiple directive antenna elements and, thus, in an overlapping region of multiple beams (in contrast, at the edge, the gain seen by a single directive antenna element may be low).

Figure 11:
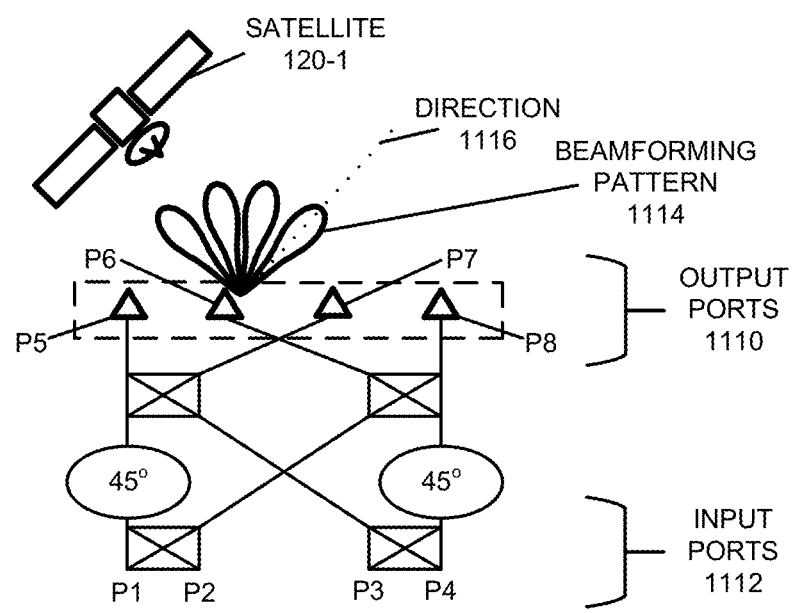
FIG. 11 is a drawing illustrating an example of an array of antenna elements in accordance with an embodiment of the present disclosure.

The first scenario is shown in FIG. 11, which presents a drawing illustrating an example of an array of antenna elements. Notably, each of the antenna elements in array may operate independently and all may be concurrently activate. In FIG. 11, a Butler matrix may include four output ports 1110 P5, P6, P7 and P8) and four input ports 1112 (P1, P2, P3 and P4). As shown in FIG. 1, there may be four directional antenna elements having associated beamforming patterns (such as beamforming pattern 1114) and directions (such as direction 1116). Moreover, as noted previously, the antenna elements may be pre-configured in such a way that together they cover the entire tracking cone through which the satellite traverses. The directivity of each of the antenna elements may be different from the directivity of the remaining antenna elements. Note that this is configuration may be static, so that dynamic electronic beam steering is not required.

In FIG. 11, a 2×2 Butler matrix may be realized using four directive antenna elements. Note that the circuits may be pre-configured for static beam forming from four antenna elements. Notably, an RF electrical signal may be output from each of input ports 1112, and then, the RF electrical signal may go through output ports 1110, thereby feeding the array elements. As a result, beam radiation patterns may be generated at a certain angle. Depending on the satellite position on an arc, the gain seen by different antenna elements may vary. Furthermore, the gain may change while the satellite receiver (e.g., in an automobile) is moving. As noted previously, in FIG. 11 all of the antenna elements may be continuously switched on or active.

Figure 12:
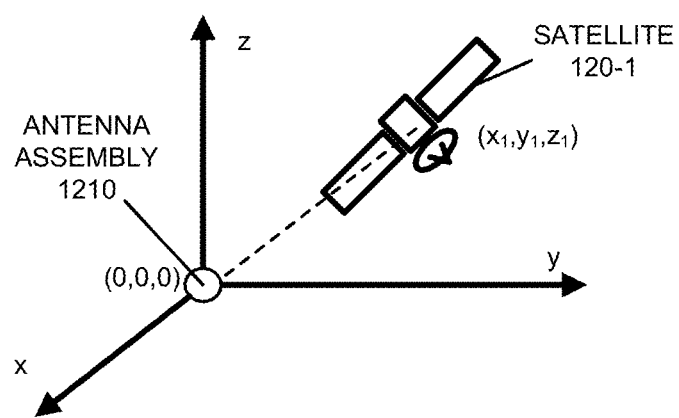
FIG. 12 is a drawing illustrating an example of a geometry in a communication system in accordance with an embodiment of the present disclosure.

In some embodiments, the gain from each of the antenna elements is measured. Moreover, using the geometry of the communication system, which is shown in FIG. 12, the theoretical gain may have previously been calculated at a certain mobile electronic-device position with respect to the location of the satellite. The satellite receiver may select the antenna element in antenna assembly 1210 that has the measured gain that is within a threshold of the theoretically calculated gain for receiving the wireless signal. In some embodiments, in order to cover up to a 66° elevation angle with an additional 4° on each side (so effectively a 62° elevation angle), a 2×2 array of antenna elements may have a peak gain per lobe of 18.3 dBi, and a 10×10 array of antenna elements may have a peak gain per lobe of 32 dBi. Therefore, the electrical signal from the beam with the highest gain antenna may be selected for further processing. The electrical signals from the remaining three antenna elements may be filtered out. When the satellite is in view from more than one of the antenna elements (such as when the satellite is at the edge of the cones of two or more directive antenna elements), the gain of multiple antenna elements may be very similar or close to each other, but may be reduced or lower compared to the maximum gain. However, because the satellite receiver may use the electrical signal from only one of the antenna elements, the satellite receiver may need to be able to operate at lower gain or lower signal strength at the edge of the beam.

We now describe the theoretical gain calculation and signal filtering. As shown in FIG. 12, a three-dimensional cartesian coordinate system may be used. A car on which the antenna assembly is mounted may be located at the origin (0,0,0) and the location of the satellite may be at $(x_1, y_1, z_1)$. Note that, even though the satellite receiver is located at the origin, not all of the antenna elements may have the same gain because of their different directivities. The gain may be calculated assuming that theoretically the antenna element is directly pointed to the satellite at a given time. Moreover, when the antenna assembly is at the origin (0,0,0), the distance vector D between the antenna assembly and the satellite may be ($x_1$-0, $y_1$-0, $z_1$-0), and the length of the distance vector $\|D\|$ may be $\sqrt{x_1^2+y_1^2+z_1^2}$. Assuming that the channel frequency is f GHz, then the wavelength, $\lambda$=c/f, where c is the speed of light. Furthermore, the time-of-flight T of a radio wave is $\|D\|$/c seconds, and the phase shift $\phi$ at the satellite receiver is given by $$T \cdot 2\pi \cdot f \text{ or } \frac{2\pi \cdot \|D\|}{\lambda}.$$

Additionally, the modulo phase shift $\phi'$ is given by the remainder of $$\frac{\phi}{2\pi},$$

and the complex wireless signal rx_s from the satellited reaching the satellite receiver is given by tx_s·L·$e^{j\phi}$, where tx_s is the transmitted wireless signal and L is the path loss. Note that in a communication system with the satellite is at a higher look or elevation angle, the free path loss can be modeled using Rice fading. Multipath fading, shadowing, blockage by vegetation, etc. are not typically encountered.

The satellite receiver may compare this theoretical receive wireless signal with the actual receive wireless signal from each antenna element (e.g., using a filter). If the difference is within a configured threshold, the electrical signal from this antenna element may be considered for further processing.

Alternatively, in some embodiments, a pilot signal receiver may be connected to each of the directive antenna elements. Then, each of the antenna elements either may continuously or periodically test the presence of the pilot signal by measuring the signal-to-noise ratio (SNR), and the satellite receiver may use the antenna element that provides the highest SNR.

Figure 13:
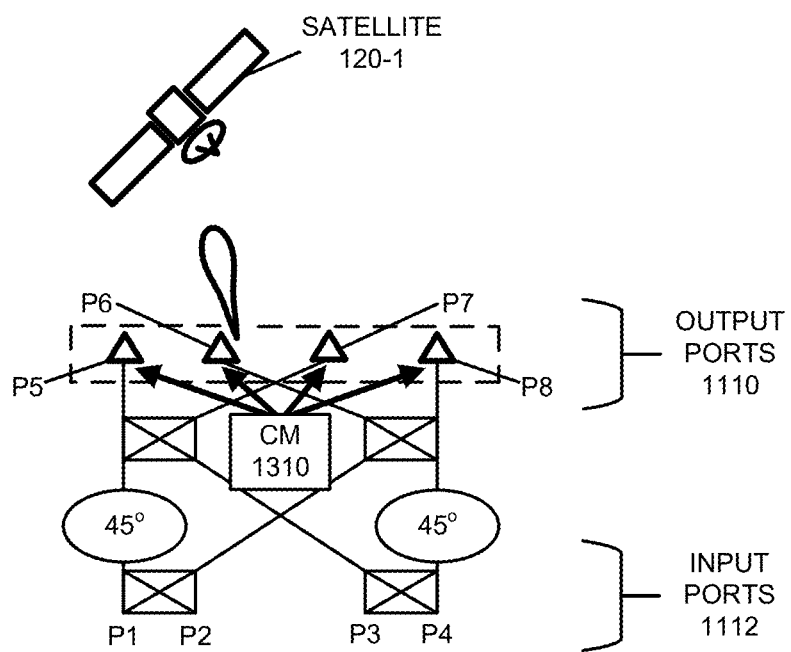
FIG. 13 is a drawing illustrating an example of an array of antenna elements in accordance with an embodiment of the present disclosure.

The second scenario is shown in FIG. 13, which presents FIG. 13 is a drawing illustrating an example of an array of antenna elements in which one antenna element is active at a given time. Thus, in FIG. 13, the antenna elements may be used independently and may not all be switched on concurrently active.

Once again, four directional antenna elements in a 2×2 array are considered. At a given time, one antenna element is switched on to reduce the power consumption. Therefore, as described further below, the satellite receiver (such as a control module or CM 1310, or control logic) may determine when a particular directive antenna element is required to turn on or off. In FIG. 13, it is shown that at a certain time the control module may have activated output port P6 and the corresponding antenna element. Consequently, only one beam may be formed as other three antenna elements are turned off.

As noted previously, the satellite receiver may be configured with or may have remote or local access to satellite ephemeris or trajectory data, which allows the satellite receiver to estimate or predict the future location of the satellite. Moreover, the vehicle that includes the satellite receiver may be equipped with a Global Positioning System sensor, so that it knows its current position and velocity or motion. Using the ephemeris data, its own location and motion data, and the directivity of the antenna element (such as the antenna orientation), the satellite receiver can predict a priori which directional antenna element will be in the view of the satellite in future. Note that, while this discussion illustrates the communication techniques with computations performed locally in the satellite receiver, in other embodiments at least some of these computations or operations may be performed remotely, such as by a cloud-based computer that can be accessed by the satellite receiver using a terrestrial wireless communication network.

Once the satellite receiver predicts which of the antenna elements should be switched on or activated, it may track satellites using an array of antenna elements without activating all of the antenna elements concurrently. In order to not lose data, during a small transition window two antenna elements may be concurrently active. However, this time duration may be very small while the satellite receiver receives wireless signals from both the switching-out and the switching-in antenna elements. Moreover, an electrical signal from one of these antenna elements may be used in subsequent processing. Furthermore, after switching off the current antenna element, the electrical signal is provided only from the newly switched in antenna element.

Figure 14:
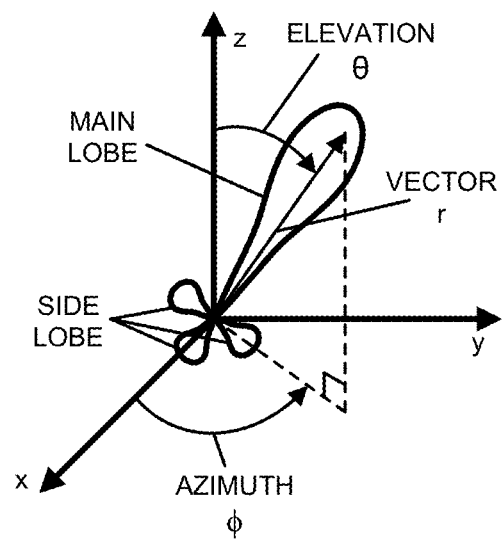
FIG. 14 is a drawing illustrating an example of a beam orientation in accordance with an embodiment of the present disclosure.

FIG. 14 presents a drawing illustrating an example of a beam orientation for a beam associated with one of the antenna elements. This geometric model may be used to determine in which time interval a specific antenna element would need to be activated.

As noted previously, the satellite receiver may be configured with or may have access to the ephemeris data is available for the satellite. Moreover, the beam-forming orientation of each of the antenna elements may be known a priori because of a pre-configured static beam that is formed by each of the antenna elements in the absence of beam-steering technique. In other words, the direction in which beams from multiple antenna elements are pointed relative to a reference, such as true North, may be known. In conjunction with the ephemeris data of satellite and the availability of electronic control logic in the vehicle (or in a remote cloud-based server or computer), it may be possible to select the best beam along the path the satellite is predicted to move. Note that in some embodiments, these results may be pre-calculated for the satellite in the satellite constellations. Then, using the results of such a calculation, one of the antenna elements may be switched on and the remaining three antenna elements may be switched off.

Figure 15:
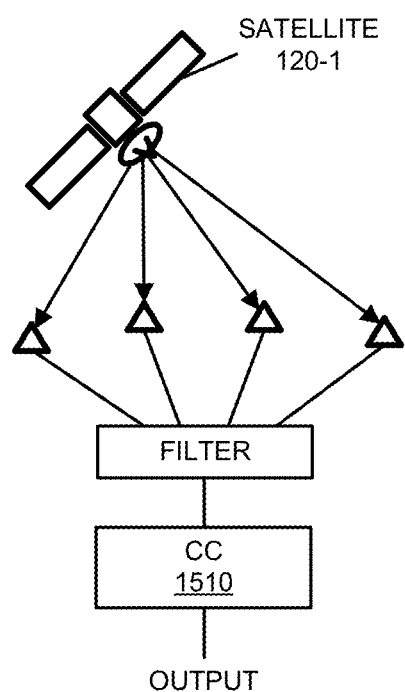
FIG. 15 is a drawing illustrating an example of receiving wireless signals using an array of antenna elements in accordance with an embodiment of the present disclosure.

The third case is shown in FIG. 15, which presents a drawing illustrating an example of receiving wireless signals using an array of antenna elements, in which the multiple directive antenna elements work collaboratively and all of them are active concurrently. This embodiment may be used to boost the gain at the edge of beam formed by any of the antenna elements by considering the fact that the edge areas of the beams from multiple antenna elements may overlap. In the overlapping region, multiple antenna elements may have connection with the same satellite with comparatively lower gains.

As shown in FIG. 15, all of the antenna elements may be active regardless of the position of the satellite. However, based on the position of the satellite, the gain seen by each element will vary. In some positional cases of the satellites, such as in a beam overlapping region of the antenna elements, it may be possible that multiple elements may receive desired wireless signals from the satellite. In this case, a combination circuit (CC) 1510 may combine or sum electrical signals from multiple antenna elements to produce a combined electrical signal with higher gain.

This approach may offer an improvement in the effective strength of the received electrical signal. A variety of techniques may be used to optimize the combination of the received electrical signals. For example, in some embodiments, the phase errors of multi-path wireless signals may be corrected and then are effectively combined with the power from the electrical signals of multiple antenna elements to produce the gain. Alternatively, in some embodiments (which may use an approach that is sometimes referred to as a 'maximum ratio combining technique'), the outputs from multiple antennas elements are combined to maximize the combined received energy to noise. Note that the output from the combination circuit 1510 may be the received electrical signal. In some embodiments, combination circuit 1510 may combine or sum the electrical signals from the antenna elements using minimum mean squared error or MMSE (which is sometimes referred to as a 'Wiener-Hopf optimization criterion'). This approach may require implementing associated equations in real-time software (such as using digital signal processing), e.g., in a digital processor for or associated with each of the antenna elements.

When there are multiple satellites in view, the target design aim may be to ensure that at least one satellite is visible to the antenna assembly of a satellite receiver. Moreover, the constellation orbit may be optimized around the places or latitudes where vehicle density is high. Note that negative cross-correlation may provide a scenario with two satellites in which, when one satellite is blocked, there may be a higher probability to see the other satellite when the satellites are separated by 90° in azimuth.

Moreover, in embodiments where the antenna assembly can view multiple satellites in a constellation, there may be multiple advantages, including providing: redundancy or diversity when the wireless signals from one of the satellites is blocked; and/or data-level redundancy when the same broadcast stream is sent from two satellites. Notably, in mobile application, it may be possible that at some locations the view of a satellite may be blocked because of tall trees, leaves, foils, etc. If there is another satellite in view in a different direction, the antenna assembly may receive wireless signals from that satellite by using the appropriate directional antenna element. In some embodiments, the satellite receiver may designate one satellite as the primary and the other as the backup. When the primary satellite is in view, the electrical signals from the primary satellite may be used, and otherwise the electrical signals from the backup satellite may be used.

Another use case is data redundancy, where the antenna assembly may track both satellites and may receive electrical signals using appropriate antenna elements. In some embodiments, the signal parameters that may be used to differentiate the satellites may include: amplitude, phase, frequency, power, modulation characteristics and/or polarization. In these embodiments, the redundancy may be applied above the RF level. Notably, the satellite receiver may collect data from both satellites and may mark the satellites from which data streams are received. The satellite receiver may transmit the same data stream through both satellites, so that if data packets from one satellite are lost, these data packets may be received from the other satellite.

Alternatively, the communication system may use two satellites to broadcast two different data streams. In this case, the antenna elements may receive electrical signals from both satellites. This configuration may allow the satellite receiver to effectively receive higher data rates. It is also possible that the communication system may divide a broadcast data stream into two segments containing alternate packets, and then may broadcast data stream corresponding to the two segments of the original data stream from two satellites, which may increase the overall bit or data rate of a single data stream.

Note that, when only one satellite is in view at a given time, reception indoors or under bridges may be poorer. Consequently, in some embodiments, the communication system may use multiple satellites to provide time diversity. For example, one satellite may broadcast its data stream with a few seconds delay compared to another satellite. When the car or any another vehicle comes out of the bridge blockage, it may receive the delayed broadcast from the other satellite containing the same data stream that the car or the other vehicle had missed from the currently selected satellite in view while it was under the bridge.

We now describe embodiments of an electronic device, which may perform at least some of the operations in the communication techniques. FIG. 16 presents a block diagram illustrating an example of an electronic device 1600 in accordance with some embodiments. For example, electronic device may include: base station 108, electronic device 110-1, computer 112, access point 116-1, one of radio nodes 118, or one of satellites 120. This electronic device may include processing subsystem 1610, memory subsystem 1612, and networking subsystem 1614. Processing subsystem 1610 includes one or more devices configured to perform computational operations. For example, processing subsystem 1610 can include one or more microprocessors, ASICs, microcontrollers, programmable-logic devices, GPUs and/or one or more digital signal processors (DSPs). Note that a given component in processing subsystem 1610 are sometimes referred to as a 'computational device.'

Memory subsystem 1612 includes one or more devices for storing data and/or instructions for processing subsystem 1610 and networking subsystem 1614. For example, memory subsystem 1612 can include dynamic random access memory (DRAM), static random access memory (SRAM), and/or other types of memory. In some embodiments, instructions for processing subsystem 1610 in memory subsystem 1612 include: program instructions or sets of instructions (such as program instructions 1622 or operating system 1624), which may be executed by processing subsystem 1610. Note that the one or more computer programs or program instructions may constitute a computer-program mechanism. Moreover, instructions in the various program instructions in memory subsystem 1612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1610.

In addition, memory subsystem 1612 can include mechanisms for controlling access to the memory. In some embodiments, memory subsystem 1612 includes a memory hierarchy that comprises one or more caches coupled to a memory in electronic device 1600. In some of these embodiments, one or more of the caches is located in processing subsystem 1610.

In some embodiments, memory subsystem 1612 is coupled to one or more high-capacity mass-storage devices (not shown). For example, memory subsystem 1612 can be coupled to a magnetic or optical drive, a solid-state drive, or another type of mass-storage device. In these embodiments, memory subsystem 1612 can be used by electronic device 1600 as fast-access storage for often-used data, while the mass-storage device is used to store less frequently used data.

Networking subsystem 1614 includes one or more devices configured to couple to and communicate on a wired and/or wireless network (i.e., to perform network operations), including: control logic 1616, an interface circuit 1618 and one or more antennas 1620 (or antenna elements). (While FIG. 16 includes one or more antennas 1620, in some embodiments electronic device 1600 includes one or more nodes, such as antenna nodes 1608, e.g., a metal pad or a connector, which can be coupled to the one or more antennas 1620, or nodes 1606, which can be coupled to a wired or optical connection or link. Thus, electronic device 1600 may or may not include the one or more antennas 1620. Note that the one or more nodes 1606 and/or antenna nodes 1608 may constitute input(s) to and/or output(s) from electronic device 1600.) For example, networking subsystem 1614 can include: a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a satellite networking system and/or another networking system.

Networking subsystem 1614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1600 may use the mechanisms in networking subsystem 1614 for performing simple wireless communication between the electronic devices, e.g., transmitting advertising or beacon frames and/or scanning for advertising frames transmitted by other electronic devices as described previously.

Note that a transmit or receive antenna pattern (or antenna radiation pattern) of electronic device 1600 may be adapted or changed using different antenna elements in one or more antennas 1620. For example, the antenna elements may have predefined fields of view and/or predefined beam widths, and electronic device 1600 may dynamically select one or more of the antenna elements (e.g., using switches). Alternatively or additionally, the transmit or receive antenna pattern may be changed using pattern shapers (such as reflectors or directors) in one or more antennas 920 (or antenna elements), which can be independently and selectively electrically coupled to ground to steer the transmit antenna pattern in different directions. For example, when a given reflector is selectively electrically coupled to ground, the given reflector may reflect the wireless signals in order to modify the antenna radiation pattern. In contrast, when a given director is selectively electrically decoupled to ground, the given director may re-radiate the wireless signals in order to modify the antenna radiation pattern. Thus, if one or more antennas 1620 include N antenna pattern shapers, the one or more antennas may have $2^N$ different antenna pattern configurations. In some embodiments, the transmit or receive antenna pattern may be changed or modified electronically, such as using the amplitudes and/or phases of electrical signals in a phased array of antennas 920 (or antenna elements). Therefore, in some embodiments, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Within electronic device 1600, processing subsystem 1610, memory subsystem 1612, and networking subsystem 1614 are coupled together using bus 1628. Bus 1628 may include an electrical, optical, and/or electro-optical connection that the subsystems can use to communicate commands and data among one another. Although only one bus 1628 is shown for clarity, different embodiments can include a different number or configuration of electrical, optical, and/or electro-optical connections among the subsystems.

In some embodiments, electronic device 1600 includes a display subsystem 1626 for displaying information on a display, which may include a display driver and the display, such as a liquid-crystal display, a multi-touch touchscreen, etc.

Moreover, electronic device 1600 may include a user-interface subsystem 1630, such as: a mouse, a keyboard, a trackpad, a stylus, a voice-recognition interface, and/or another human-machine interface. In some embodiments, user-interface subsystem 1630 may include or may interact with a touch-sensitive display in display subsystem 1626.

Electronic device 1600 can be (or can be included in) any electronic device with at least one network interface. For example, electronic device 1600 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a radio node, a router, a switch, communication equipment, a controller, test equipment, an automobile, a truck, a motorcycle, a bus, a train, and/or another electronic device.

Although specific components are used to describe electronic device 1600, in alternative embodiments, different components and/or subsystems may be present in electronic device 1600. For example, electronic device 1600 may include one or more additional processing subsystems, memory subsystems, networking subsystems, and/or display subsystems. Additionally, one or more of the subsystems may not be present in electronic device 1600. Moreover, in some embodiments, electronic device 1600 may include one or more additional subsystems that are not shown in FIG. 16. Also, although separate subsystems are shown in FIG. 16, in some embodiments some or all of a given subsystem or component can be integrated into one or more of the other subsystems or component(s) in electronic device 1600. For example, in some embodiments program instructions 1622 are included in operating system 1624 and/or control logic 1616 is included in interface circuit 1618.

Moreover, the circuits and components in electronic device 1600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1614 and/or electronic device 1600. The integrated circuit may include hardware and/or software mechanisms that are used for transmitting wireless signals from electronic device 1600 and receiving signals at electronic device 1600 from other electronic devices. Aside from the mechanisms herein described, radios or transceivers are generally known in the art and hence are not described in detail. In general, networking subsystem 1614 and/or the integrated circuit can include any number of radios. Note that the radios in multiple-radio embodiments function in a similar way to the described single-radio embodiments.

In some embodiments, networking subsystem 1614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio or the transceiver from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet, a cellular-telephone communication protocol (such as LTE), a Wi-Fi communication protocol and/or a satellite communication protocol as an illustrative example, in other embodiments a wide variety of communication protocols and, more generally, wireless communication techniques may be used. For example, the communication protocol in a WLAN may use OFDMA. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1622, operating system 1624 (such as a driver for interface circuit 1618) or in firmware in interface circuit 1618. Thus, the communication techniques may be implemented at runtime of program instructions 1622. Alternatively or additionally, at least some of the operations in the communication techniques may be implemented in a physical layer, such as hardware in interface circuit 1618.

In the preceding description, we refer to 'some embodiments.' Note that 'some embodiments' describes a subset of all of the possible embodiments, but does not always specify the same subset of embodiments. Moreover, note that the numerical values provided are intended as illustrations of the communication techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an array of antenna elements having associated predefined fields of view configured to receive wireless signals associated with at least a satellite and to provide corresponding electrical signals,
wherein at least two of the antenna elements in the array of antenna elements have different predefined fields of view;
one or more switches configured to selectively couple to antenna elements in the array of antenna elements; and
one or more integrated circuits, coupled to the one or more switches, configured to receive the electrical signals, wherein the one or more integrated circuits are configured to:
dynamically select at least a given antenna element in the array of antenna elements based at least in part on a location and motion of the electronic device, and a location and motion of at least the satellite;
provide control signals to at least one of the one or more switches to selectively couple to at least the given antenna element; and
receive, via the given antenna element, the electrical signals,
wherein the wireless signals have carrier frequencies in a V band of frequencies or a W band of frequencies and the array of antenna elements has improved power efficiency, pointing accuracy and isotropic gain relative to an array of antenna elements without switched antenna elements.

2. The electronic device of claim 1, wherein the antenna elements in the array of antenna elements are non-planar.

3. The electronic device of claim 1, wherein the location and motion of at least the satellite are predefined.

4. The electronic device of claim 1, wherein the location of the electronic device comprises latitude and longitude of the electronic device.

5. The electronic device of claim 1, wherein the one or more integrated circuits are configured to selectively communicate with a terrestrial wireless communication network; and
   wherein the given antenna element is dynamically selected based at least in part on at least one of: utilization of the terrestrial wireless communication network; or availability of the terrestrial wireless communication network.

6. The electronic device of claim 1, wherein the one or more integrated circuits are configured to selectively communicate with a terrestrial wireless communication network and the communication with the terrestrial wireless communication network is bidirectional.

7. The electronic device of claim 1, wherein the electronic device is configured to selectively accept or reject receiving of content conveyed by the electrical signals.

8. The electronic device of claim 1, wherein the electronic device is configured to predict availability of communication with at least the satellite.

9. The electronic device of claim 1, wherein the one or more integrated circuits are configured to predict a data rate of communication with at least the satellite based at least in part on the given antenna element.

10. The electronic device of claim 1, wherein the given antenna element is dynamically selected based at least in part on utilization of at least the satellite.

11. The electronic device of claim 1, wherein the given antenna element has an associated data rate of communication with at least the satellite and the given antenna element is dynamically selected based at least in part on a priority of content conveyed by the electrical signals.

12. The electronic device of claim 1, wherein the electronic device is configured to concurrently receive second electrical signals associated with a second satellite; and
   wherein the electrical signals and the second electrical signals provide: redundancy of communicated information, or communicate different data streams.

13. A method for receiving electrical signals, comprising: by an electronic device:
   dynamically selecting at least, a given antenna element in an array of antenna elements based at least in part on a location and motion of the electronic device, and
   a location and motion of at least a satellite, wherein the array of antenna elements have associated predefined fields of view configured to receive wireless signals associated with at least the satellite and to provide the corresponding electrical signals, and
   wherein at least two of the antenna elements in the array of antenna elements have different predefined fields of view;
   providing control signals to at least one of one or more switches to selectively couple to at least the given antenna element,
   wherein the one or more switches selectively couple to antenna elements in the array of antenna elements; and
   receiving, via the given antenna element and one or more integrated circuits, the electrical signals,
   wherein the wireless signals have carrier frequencies in a V band of frequencies or a W band of frequencies and the array of antenna elements has improved power efficiency, pointing accuracy and isotropic gain relative to an array of antenna elements without switched antenna elements.

14. The method of claim 13, wherein the one or more integrated circuits are selectively communicate with a terrestrial wireless communication network; and
   wherein the given antenna element is dynamically selected based at least in part on at least one of: utilization of the terrestrial wireless communication network; or availability of the terrestrial wireless communication network.

15. A communication system, comprising:
   a satellite configured to provide wireless signals; and
   an electronic device, comprising:
      an array of antenna elements having associated predefined fields of view configured to receive the wireless signals and to provide corresponding electrical signals, wherein at least two of the antenna elements in the array of antenna elements have different predefined fields of view;
      one or more switches configured to selectively couple to antenna elements in the array of antenna elements; and
      one or more integrated circuits, coupled to the one or more switches, configured to receive the electrical signals, wherein the one or more integrated circuits are configured to:
         dynamically select at least a given antenna element in the array of antenna elements based at least in part on a location and motion of the electronic device, and
         a location and motion of at least the satellite;
         provide control signals to at least one of the one or more switches to selectively couple to at least the given antenna element; and
         receive, via the given antenna element, the electrical signals,
         wherein the wireless signals have carrier frequencies in a V band of frequencies or a W band of frequencies and
         the array of antenna elements has improved power efficiency, pointing accuracy and isotropic gain relative to an array of antenna elements without switched antenna elements.

16. The communication system of claim 15, wherein the antenna elements in the array of antenna elements are non-planar.

17. The communication system of claim 15, wherein the location and motion of at least the satellite are predefined.

18. The communication system of claim 15, wherein the one or more integrated circuits are configured to selectively communicate with a terrestrial wireless communication network; and
   wherein the given antenna element is dynamically selected based at least in part on at least one of: utilization of the terrestrial wireless communication network; or availability of the terrestrial wireless communication network.

19. The communication system of claim 15, wherein the electronic device is configured to selectively accept or reject receiving of content conveyed by the electrical signals.

20. The communication system of claim 15, wherein the one or more integrated circuits are configured to predict a data rate of communication with at least the satellite based at least in part on the given antenna element.

* * * * *